(12) United States Patent
Namekata

(10) Patent No.: US 9,371,980 B2
(45) Date of Patent: Jun. 21, 2016

(54) ILLUMINATION DEVICE, DISPLAY DEVICE, AND TELEVISION RECEIVER DEVICE

(71) Applicant: Sharp Kabushiki Kaisha, Osaka (JP)

(72) Inventor: Yuuki Namekata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 272 days.

(21) Appl. No.: 14/360,229

(22) PCT Filed: Nov. 22, 2012

(86) PCT No.: PCT/JP2012/080289
§ 371 (c)(1),
(2) Date: May 22, 2014

(87) PCT Pub. No.: WO2013/080882
PCT Pub. Date: Jun. 6, 2013

(65) Prior Publication Data
US 2015/0042897 A1    Feb. 12, 2015

(30) Foreign Application Priority Data
Nov. 29, 2011    (JP) ................ 2011-260504

(51) Int. Cl.
| | |
|---|---|
| *G09F 13/04* | (2006.01) |
| *F21V 17/08* | (2006.01) |
| *G02F 1/1335* | (2006.01) |
| *F21V 7/05* | (2006.01) |
| *F21V 19/00* | (2006.01) |
| *H04N 5/645* | (2006.01) |
| *H04N 5/66* | (2006.01) |

(52) U.S. Cl.
CPC . *F21V 17/08* (2013.01); *F21V 7/05* (2013.01); *F21V 19/005* (2013.01); *G02F 1/133603* (2013.01); *G02F 1/133605* (2013.01); *G02F 1/133608* (2013.01); *H04N 5/645* (2013.01); *G02F 2001/133607* (2013.01); *G02F 2201/46* (2013.01); *H04N 5/66* (2013.01)

(58) Field of Classification Search
CPC ......... F21V 17/08; F21V 7/05; F21V 19/005; G02F 1/133603; G02F 1/133604; G02F 1/133605; G02F 1/133606; G02F 1/133608; G02F 1/133611; G02F 2201/46; G02F 465/48; H04N 5/645; G02B 6/0088; G02B 6/0091
See application file for complete search history.

(56) References Cited

U.S. PATENT DOCUMENTS 8,797,475 B2 * 8/2014 Kuromizu ......... G02F 1/133608 349/58
9,134,007 B2 * 9/2015 Wang ...................... F21V 5/043
(Continued)

FOREIGN PATENT DOCUMENTS

| JP | 2011-34948 A | 2/2011 |
|---|---|---|
| WO | 2011/152133 A1 | 12/2011 |

*Primary Examiner* — Evan Dzierzynski
*Assistant Examiner* — Leah S Macchiarolo
(74) *Attorney, Agent, or Firm* — Chen Yoshimura LLP

(57) ABSTRACT

The backlight device 12 of the present embodiment includes: a plurality of LEDs 17; a chassis 14 that is a plate-shaped member and on which the LEDs 17 are arranged; a plurality of diffusion lenses 40 that are fixed to the chassis 14, that individually cover the LEDs 17 from the side opposite to the chassis 14, and that exert optical effects on the light from the LEDs 17; a reflective sheet 21 that covers the plate surface of the chassis 14, that exposes the LEDs 17, and that has the lens insertion holes 21 through which the diffusion lenses 40 are respectively inserted; and reflective sheet holding members 30 that hold the reflective sheet 21 from the side opposite to the chassis 14, that engage the adjacent diffusion lenses 40 and 40, and that extend on the sheet surface of the reflective sheet 21 between the adjacent diffusion lenses 40 and 40.

15 Claims, 14 Drawing Sheets

(56) References Cited

U.S. PATENT DOCUMENTS

| | | | | |
|---|---|---|---|---|
| 2008/0106897 A1* | 5/2008 | Yoon | | G02B 3/0056 362/235 |
| 2008/0298060 A1* | 12/2008 | Ohkawa | | G02B 3/0056 362/240 |
| 2012/0087122 A1 | 4/2012 | Takeuchi et al. | | |
| 2012/0087126 A1 | 4/2012 | Takeuchi et al. | | |
| 2013/0050588 A1 | 2/2013 | Kamada | | |
| 2015/0077977 A1* | 3/2015 | Gu | | G02F 1/133605 362/97.3 |

* cited by examiner

ILLUMINATION DEVICE, DISPLAY DEVICE, AND TELEVISION RECEIVER DEVICE

TECHNICAL FIELD

The present invention relates to an illumination device, a display device, and a television receiver.

BACKGROUND ART

Image display devices such as television receivers have become thinner recently with thin display elements such as liquid crystal panels or plasma multi-displays replacing conventional cathode-ray tubes. When using a liquid crystal panel as a display element, it is necessary to have a separately provided illumination device as the backlight device, since liquid crystal panels do not emit light on their own.

A backlight device is disclosed in Patent Document 1 having a plurality of LEDs (light sources), light-emitting diode substrates (light source substrates) on which the LEDs are mounted, a substrate support member (chassis) housing the light-emitting diode substrates, and a reflective sheet covering the light-emitting diode substrates and the substrate support member. In this backlight device, lenses that cover each LED individually are provided, and first holes for inserting these lenses are formed in the reflective sheet. Furthermore, in this backlight device, third holes are formed in the reflective sheet and fitting holes are formed in the light-emitting diode substrates. A shaft (rivet) that goes through these third holes and fitting holes and that attaches to the substrate support member is also provided. The head of the shaft is larger in diameter than the third holes, and the inner surface of the shaft faces the vicinity of the third holes in the reflective sheet; therefore, it is possible to prevent the reflective sheet from tilting away from the light-emitting diode substrate.

RELATED ART DOCUMENT

Patent Document

Patent Document 1: Japanese Patent Application Laid-Open Publication No. 2011-34948

Problems to be Solved by the Invention

However, in Patent Document 1, the shaft attaches to the chassis through the fitting hole in the light source substrate, and thus, the fitting holes cannot be formed where the wiring patterns of the light source substrates are provided and the like. Therefore, there is a risk that the reflective sheet could rise and uneven brightness could occur where the reflective sheet is unable to be secured by the shaft.

Furthermore, in Patent Document 1, the first holes for inserting the lenses are formed in the reflective sheet, and the edges of the first holes are near the LEDs. Thus, if the edges of the holes expand or contract due to heat from the LEDs, then the reflective sheet could warp and become deformed, and this warped portion could cause shadows and lead to uneven brightness.

SUMMARY OF THE INVENTION

The present invention was completed on the basis of the above-mentioned situation, and aims at securing the reflective sheet to the chassis and reducing uneven brightness.

Means for Solving the Problems

To solve the above-mentioned problems, an illumination device of the present invention includes: a plurality of light sources; a chassis that is a plate-shaped member having the light sources mounted on a surface thereof; a plurality of optical elements mounted on the chassis to respectively cover the light sources, the optical elements applying an optical effect on light from the light sources; a reflective sheet covering the surface of the chassis and exposing the light sources, the reflective sheet having openings through which the optical elements are inserted; and holding members that hold the reflective sheet from the side opposite to the chassis and that respectively engage at least some pairs of the optical elements that are adjacent to each other, the holding member being arranged on a surface of the reflective sheet between the optical elements that are adjacent.

In the illumination device of the present invention, the reflective sheet holding member is engaged by the optical elements fixed to the chassis and provided on the surface of the reflective sheet between the optical elements that are adjacent; therefore, the reflective sheet can be held from the side opposite to the chassis across the space between the openings in the reflective sheet. As a result, warping of the edges of the openings can be suppressed, the reflective sheet can be held to the chassis, and the occurrence of uneven brightness can be reduced.

The above-mentioned configuration can further include light source substrates that are fixed to the chassis to mount the light sources on the chassis, the light source substrates having the optical elements fixed thereto.

With such a configuration, the light source substrate can be fixed to the chassis, thereby making it possible to fix the optical elements to the chassis with ease.

In the above-mentioned configuration, each of the optical elements can have column-shaped attachment legs that are fixed to the light source substrate, and the attachment legs can engage the holding member.

With such a configuration, the attachment legs have a column shape, and thus, the optical elements can engage the reflective sheet holding member with ease.

In the above-mentioned configuration, each of the optical elements can have a lens part supported by the attachment legs and extending in an eave-shape from the attachment legs, and the lens part can engage the holding member.

With such a configuration, the reflective sheet holding member falling towards the lens part of the optical element can be suppressed.

In the above-mentioned configuration, a width of the holding member can be substantially the same size as a gap between the surface of the reflective sheet and the lens part facing the surface of the reflective sheet.

With such a configuration, the lens part can position the reflective sheet holding member with respect to the reflective sheet, and the reflective sheet can be suitably held.

In the above-mentioned configuration, the holding member can be an elastic looped member that surrounds the optical elements that are adjacent and that engages the optical elements by elastic force contracting in a circumferential direction.

With such a configuration, the reflective sheet holding member can reliably engage the optical elements by the elastic force of the reflective sheet holding member, and the reflective sheet can be suitably held.

In the above-mentioned configuration, the holding member can have two gripping parts respectively arranged on both ends thereof and a sheet pressing part that connects the two gripping parts, the gripping parts gripping a periphery of the attachment legs.

With such a configuration, the gripping parts can reliably engage the optical elements, and the sheet pressing part can hold the reflective sheet, thereby making it possible to suitably hold the reflective sheet.

In the above-mentioned configuration, the optical elements can be arranged in rows and columns inside the chassis, and the holding member can engage the optical elements located on edges of the rows and columns.

With such a configuration, it is possible to mitigate the rising of the edges of the reflective sheet even if members to hold the reflective sheet such as rivets are not provided on the edges of the reflective sheet due to the frame of the illumination device being made narrower.

In the above-mentioned configuration, with respect to some of the pairs of the optical elements that are mutually adjacent and engage the holding members, one of the pair of the optical elements can be on one light source substrate and another of the pair of the optical elements can be on another light source substrate.

With such a configuration, the rising up of the reflective sheet due to level differences can suppressed even if the level differences occur between the two light source substrates because of deviations in size or warping of these two light source substrates.

In the above-mentioned configuration, the one light source substrate can be connected to the another light source substrate through a connector, the reflective sheet can have a connector insertion hole between the two openings where the respective optical elements that are adjacent are inserted, the connecter insertion hole being where the connector is inserted, and the holding member can overlap an edge of the connector insertion hole.

With such a configuration, the reflective sheet rising up at the edges of the connector insertion hole can be suppressed.

In the above-mentioned configuration, the light source substrate can be fixed to the chassis by a rivet, the reflective sheet can have a rivet insertion hole between the two openings where the respective optical elements that are adjacent are inserted, the rivet insertion hole being where the rivet is inserted, and the holding member can overlap an edge of the rivet insertion hole.

With such a configuration, it is possible to mitigate the rising of the reflective sheet at the edge of the rivet insertion hole.

In the above-mentioned configuration, the optical elements are diffusion lenses that can diffuse light from the respective light sources.

With such a configuration, uneven brightness can be markedly reduced by providing the diffusion lenses.

Next, in order to achieve the above-mentioned object, a display device of the present invention includes the above-mentioned illumination device and a display panel that performs display by using light from the illumination device.

With such a display device, the luminance of the light from the illumination device supplied to the display panel is uniform, and thus, it is possible to achieve a display with excellent display quality.

Examples of the display panel can include a liquid crystal panel. As a liquid crystal display device, such a display device can be applied to various applications such as a television or the display of a personal computer, for example, and is particularly suitable for large screens.

Effects of the Invention

According to the present invention, an illumination device capable of reducing uneven brightness can be provided.

DETAILED DESCRIPTION OF EMBODIMENTS

<Embodiment 1>

Figure 2:
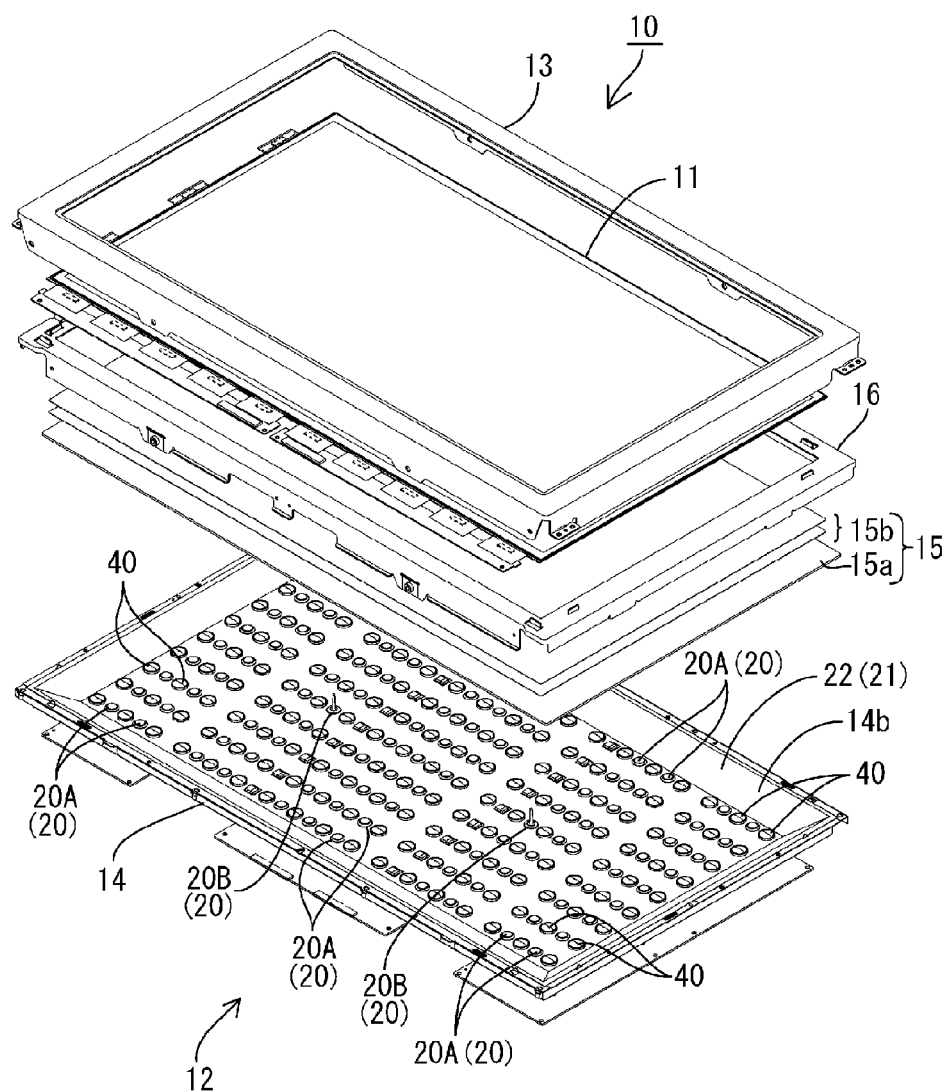
FIG. 2 is an exploded perspective view of a schematic configuration of a liquid crystal display device provided in the television receiver.
Figure 3:
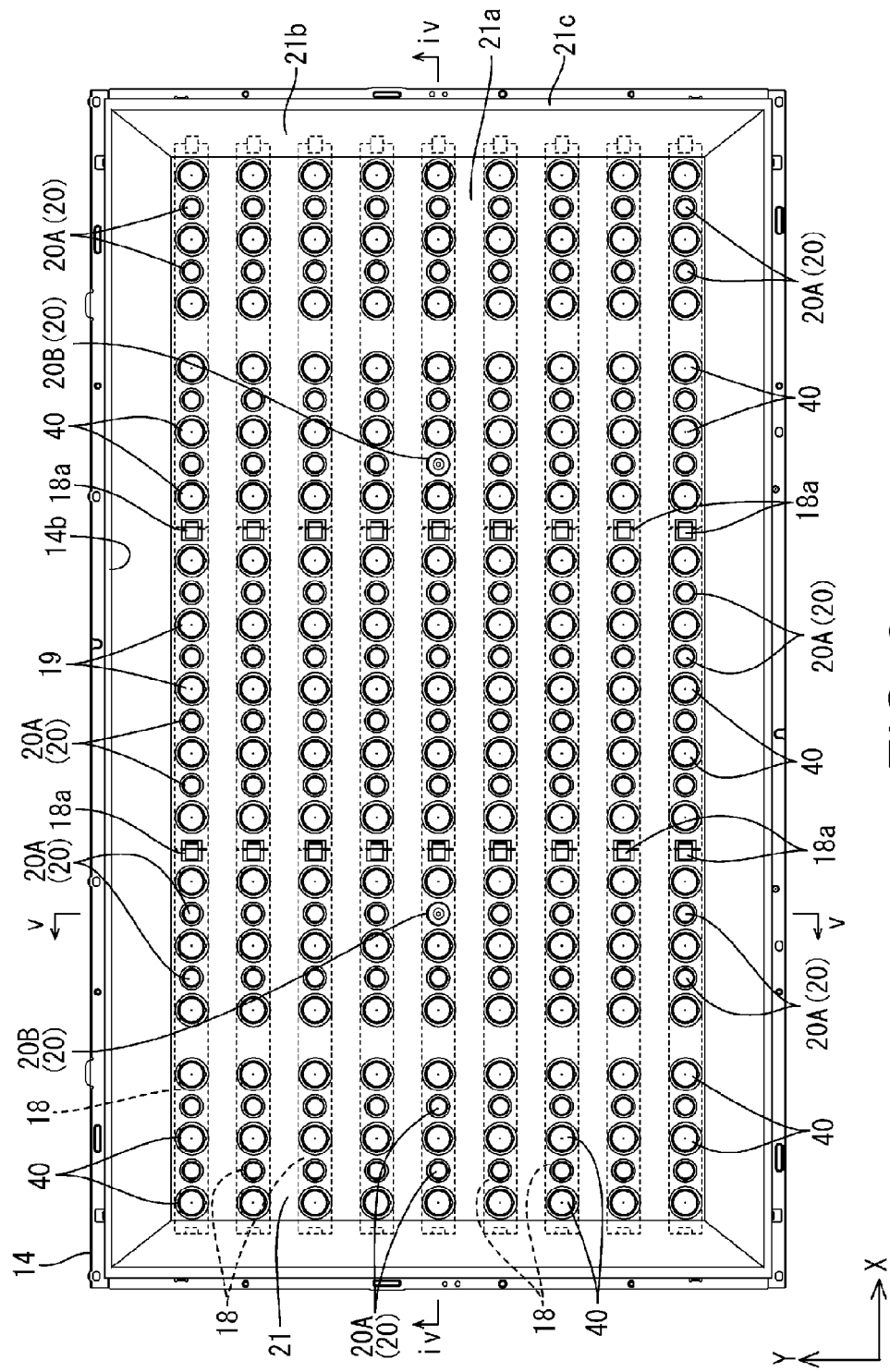
FIG. 3 is a plan view of an arrangement of diffusion lenses and a reflective sheet in a chassis, which is provided in the liquid crystal display device.
Figure 4:
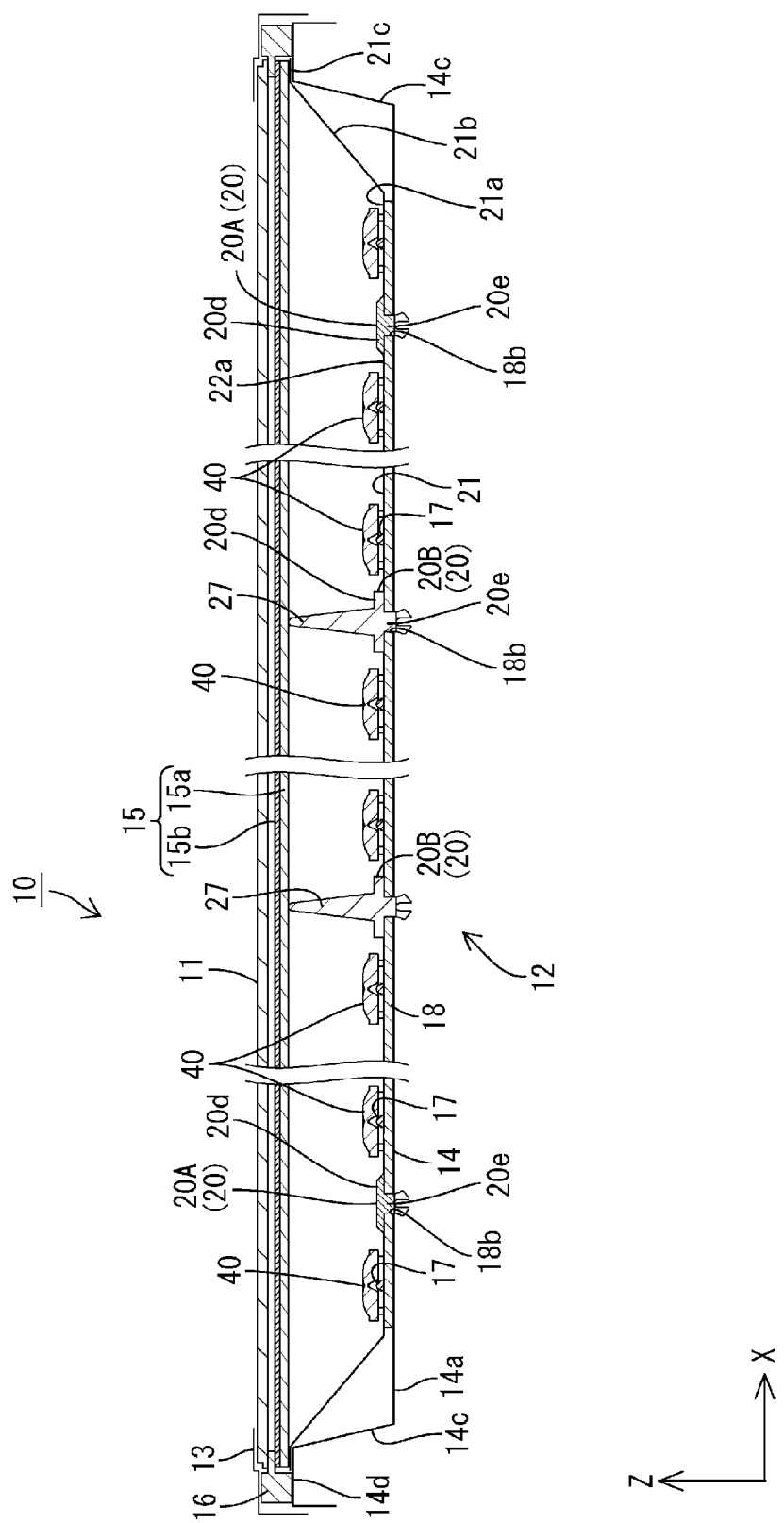
FIG. 4 is a cross-sectional view of the liquid crystal display device in FIG. 3 along the line iv-iv.
Figure 5:
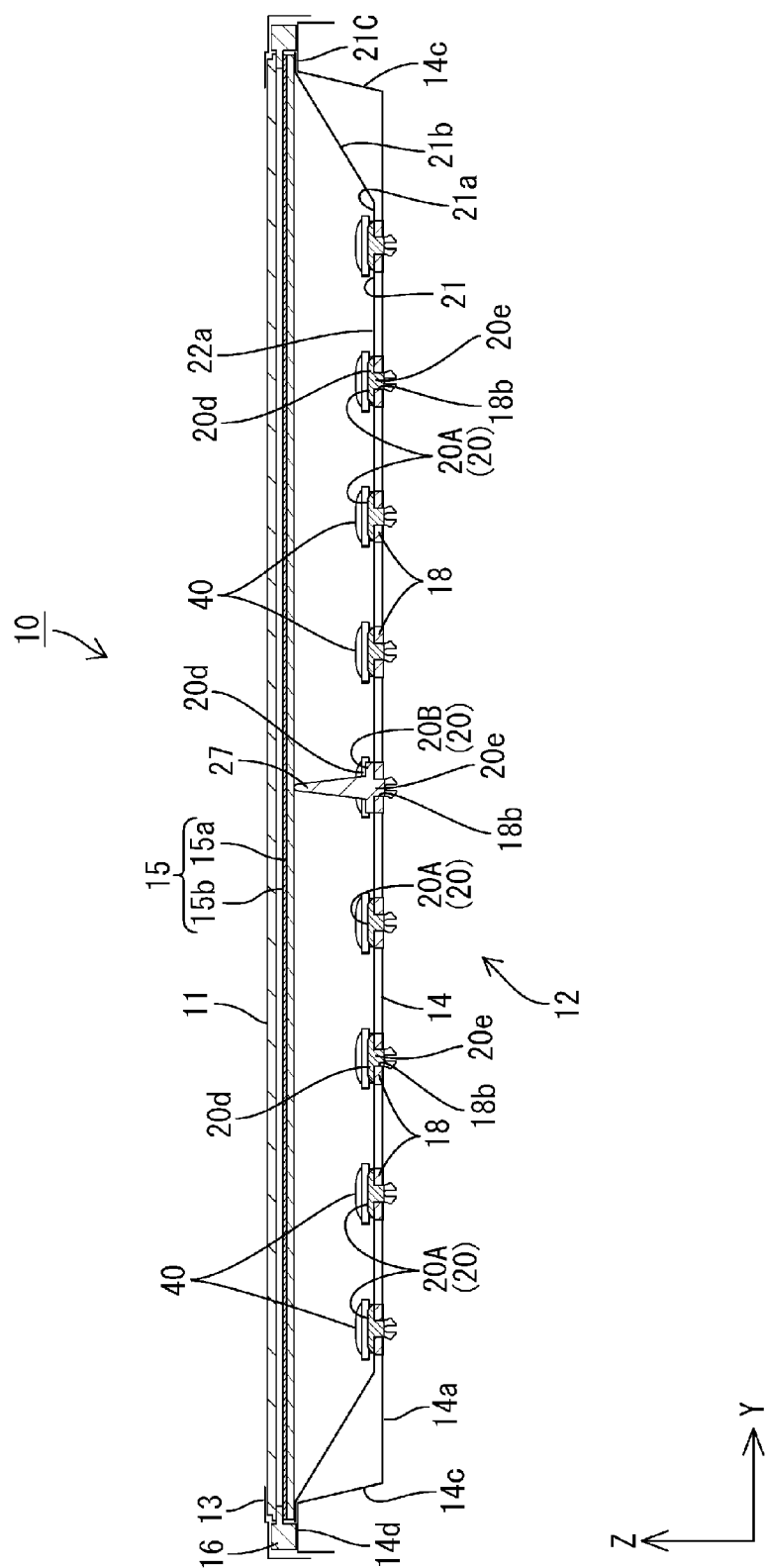
FIG. 5 is a cross-sectional view of the liquid crystal display device in FIG. 3 along the line v-v.

Embodiment 1 of the present invention will be described with reference to FIGS. 1 to 9. In the present embodiment, a liquid crystal display device 10 will be described as an example. An X axis, Y axis, and Z axis are shown in a portion of every drawing, and the direction of these axes are drawn so as to be the same direction in every drawing. The top side of FIGS. 4 and 5 is the front side, and the bottom side of FIGS. 4 and 5 is the rear side.

Figure 1:
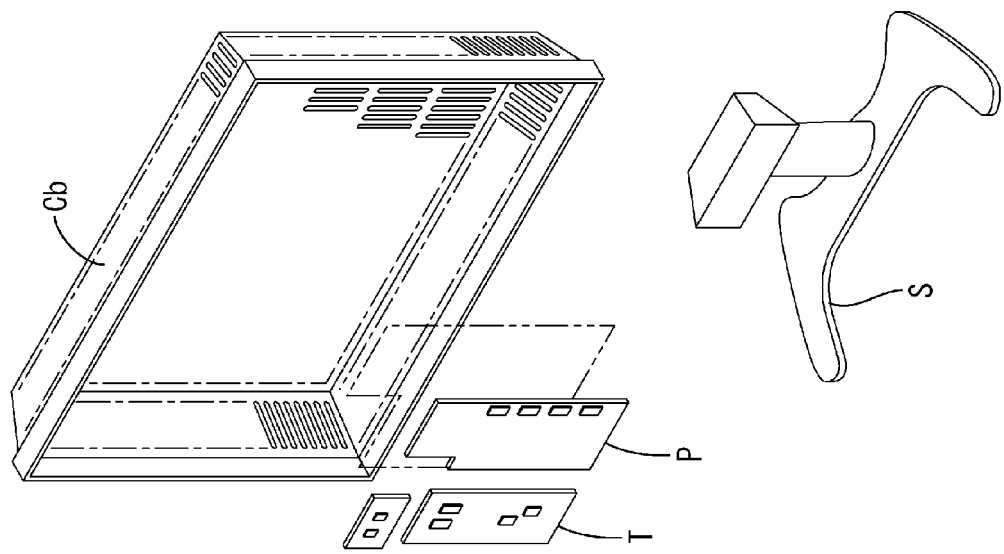
FIG. 1 is an exploded perspective view of a schematic configuration of a television receiver according to Embodiment 1 of the present invention.
Figure 1:
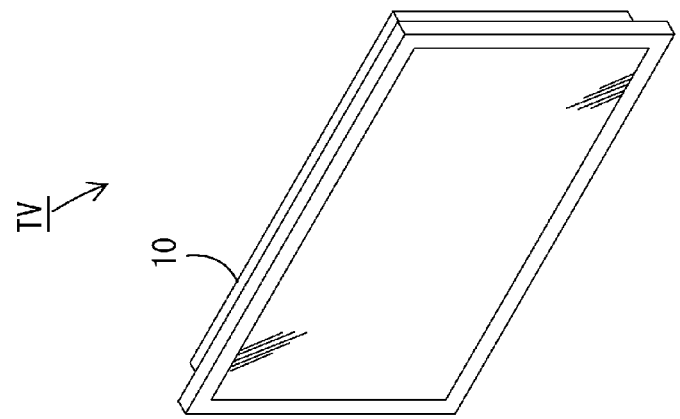
Figure 1:
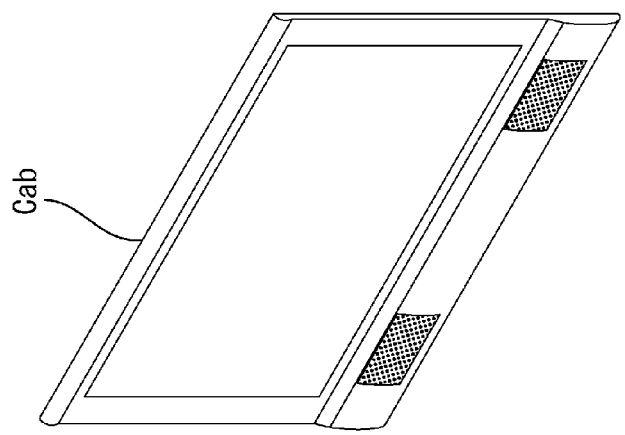

As shown in FIG. 1, a television receiver TV of the present embodiment includes a liquid crystal display device 10, a front cabinet and a rear cabinet Cab and Cb that sandwich the liquid crystal display device 10, a power source P, a tuner T, and a stand S. The liquid crystal display device (display device) 10 is formed in a horizontally long rectangular shape as a whole, and is housed in a vertical orientation. As shown in FIG. 2, the liquid crystal display device 10 includes a liquid crystal panel 11 that is a display panel, and a backlight device (illumination device) 12 that is an external light source, and these are held together by a frame-shaped bezel 13 or the like.

Next, the liquid crystal panel 11 and the backlight device 12, which constitute the liquid crystal display device 10, will be described. The liquid crystal panel (display panel) 11 is formed in a rectangular shape in a plan view, and includes a pair of glass substrates bonded with a prescribed gap therebetween, and liquid crystal sealed between the two substrates. Switching devices (TFTs, for example) connected to source wiring lines and gate wiring lines orthogonal to each other, pixel electrodes connected to the respective switching devices, an alignment film, and the like are provided on one of the glass substrates. Color filters including colored portions such as R (red), G (green), and B (blue) arranged in prescribed arrays, an opposite electrode, an alignment film, and the like are provided on the other glass substrate. Polarizing plates are respectively provided on outer sides of the two substrates.

Next, the backlight device 12 will be described. As shown in FIG. 2, the backlight device 12 includes: a substantially box-shaped chassis 14 having an opening 14b where light from the light sources exits to the light-exiting section (the liquid crystal panel 11 side); a group of optical members 15 (diffusion plate 15a, and a plurality of optical sheets 15b between the diffusion plate 15a and the liquid crystal panel 11) arranged so as to cover the opening 14b of the chassis 14; and a frame 16 that is arranged along the outer edge of the chassis 14 and that holds the outer edge of the optical members 15 group between the chassis 14 and the frame 16 itself. As shown in FIGS. 3 to 5, LEDs 17 (light-emitting diodes) as light sources, LED substrates 18 (light source substrates) on which the LEDs 17 are mounted, and diffusion lenses 40 (optical elements) attached to the LED substrates 18 so as to individually cover the respective LEDs 17 are provided inside the chassis 14. Rivets 20 that fix the LED substrates 18 to the chassis 14, a reflective sheet 21 that reflects light in the chassis 14 towards the optical members 15, and reflective sheet holding members 30 that holds the reflective sheet 21 from the side opposite to the chassis 14 are also provided inside the chassis 14. Each component of the backlight device 12 will be described in detail below.

The chassis 14 is made of metal, and as shown in FIGS. 3 to 5 is constituted of a bottom plate 14a that is rectangular, in a manner similar to the liquid crystal panel 11, side plates 14c that rise from the respective outer edges of the bottom plate 14a, and supporting plates 14d that protrude outward from the rising of the respective side plates 14c. The chassis 14 has a substantially shallow box shape (substantially shallow plate shape) as a whole with an opening on the front side thereof. In the chassis 14, the long side direction thereof matches the X axis direction, and the short side direction thereof matches the Y axis direction. The frame 16 and the optical members 15, which will be described below, can be placed, from the front side, on respective supporting plates 14d of the chassis 14. The frame 16 is fastened to the supporting plates 14d with screws. The bottom plate 14a of the chassis 14 has formed therein openings that are attachment holes for attaching the holding members 20.

As shown in FIG. 2, the optical members 15 are rectangular with a long side being the horizontal direction in a plan view, as in the liquid crystal panel 11 and the chassis 14. As shown in FIGS. 4 and 5, the outer edges of the optical members 15 are placed on the supporting plates 14d, thereby covering the opening 14b in the chassis 14 and being interposed between the liquid crystal panel 11 and the LEDs 17. The optical members 15 include the diffusion plate 15a disposed on the rear (LEDs 17 side, opposite to a light-exiting section 12a), and optical sheets 15b disposed on the front (liquid crystal panel 11 side, the light-exiting section 12a side). The diffusion plate 15a has a configuration in which a plurality of diffusion particles are dispersed inside a base material made of an almost completely transparent resin having a prescribed thickness, and has the function of diffusing light that is transmitted therethrough. The optical sheets 15b are sheet-shaped and thinner than the diffusion plate 15a, and two optical sheets 15b are stacked, one on top of the other. Specific types of optical sheets 15b include a diffusion sheet, a lens sheet, a reflective polarizing sheet, and the like, for example, and it is possible to appropriately choose any of these as the optical sheets 15b.

As shown in FIG. 2, the frame 16 is formed in a frame shape along the outer edges of the liquid crystal panel 11 and the optical members 15. The outer edges of the optical members 15 can be sandwiched between the frame 16 and the respective supporting plates 14d (refer to FIGS. 4 and 5). The frame 16 receives the outer edges of the liquid crystal panel 11 from the rear side thereof, and sandwiches the outer edges of the liquid crystal panel 11 with the bezel 13 that is disposed on the front side (see FIGS. 4 and 5).

Next, the LEDs 17 and LED substrates 18 on which the LED 17s are mounted will be described. Each of the LEDs 17 has a configuration in which an LED chip is sealed by a resin material on a substrate part that is bonded to the LED substrate 18. The LED chip mounted on the substrate part has one type of primary light-emitting wavelength, and specifically, only emits blue light. The resin material sealing the LED chip, on the other hand, has a phosphor dispersed therein that converts blue light emitted by the LED chip to white light. This way, the LED 17 can emit white light. The LEDs 17 are of a so-called top-type in which the side opposite to that mounted onto the LED substrates 18 is the light-emitting surface. An optical axis LA of the LEDs 17 is configured to approximately match the Z axis direction (the direction orthogonal to the main plate surface of the liquid crystal panel 11 and the optical members 15). The light emitted from the LEDs 17 spreads out three-dimensionally in an approximately radial fashion within a prescribed angular range with the optical axis LA at the center thereof. However, the directivity of this light is higher than cold cathode fluorescent tubes and the like. In other words, the light-emitting intensity of the LEDs 17 exhibits an angular distribution in which the intensity of light along the direction of the optical axis LA tends to be high, and the intensity tends to decrease as the inclination angle relative to the optical axis LA becomes larger.

Figure 9:
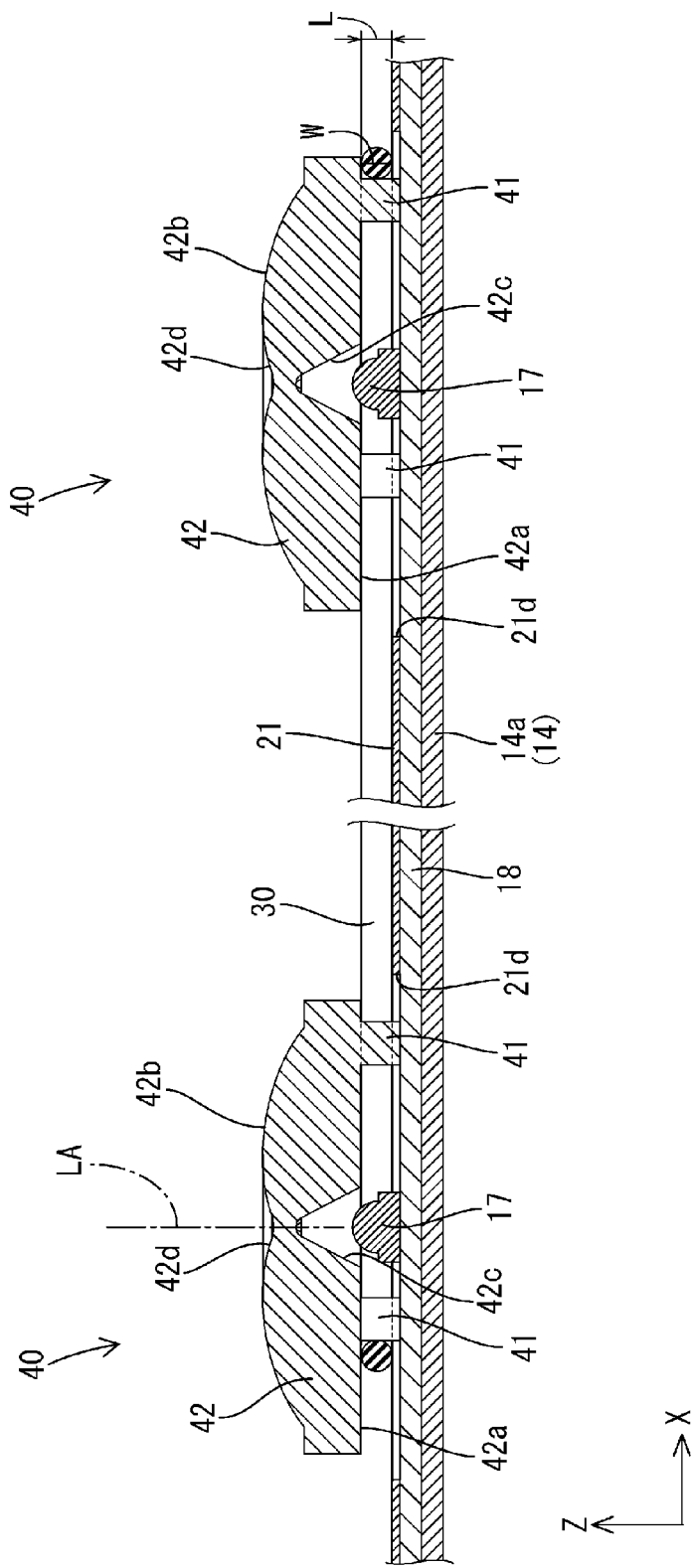
FIG. 9 is a cross-sectional view of FIG. 8 along the line ix-ix.

The LED substrates 18 are rectangular in a plan view, the long sides thereof match the X axis direction (the long side direction of the bottom plate 14a of the chassis 14), and the short sides thereof match the Y axis direction (the short side direction of the bottom plate 14a of the chassis 14). The LED substrates 18 are housed in this state while extending along the bottom plate 14a in the chassis 14 (see FIGS. 3 to 5). The base material of the LED substrates 18 is a metal such as the same aluminum material as the chassis 14, and respective wiring patterns (not shown) made of a metal film such as copper foil are formed over an insulating layer (not shown) on the surface of the LED substrates 18. As shown in FIG. 9, LEDs 17 having the above configuration are mounted on the surfaces of the LED substrates 18 facing the front side (the surfaces facing the optical members 15 side). A plurality of the LEDs 17 are arranged in linear columns along the long side direction (X axis direction) of the LED substrates 18, and are connected in series by the wiring patterns formed on the LED substrates 18. The array pitch of the respective LEDs 17 is substantially uniform. In other words, the respective LEDs 17 are arrayed equidistant to each other. Both ends in the long side direction of the LED substrates 18 have connectors 18a.

As shown in FIG. 3, a plurality of LED substrates 18 having the above-mentioned configuration are disposed in the chassis 14 along the X axis direction and the Y axis direction, respectively, such that the respective long sides are aligned along the same direction and the respective short sides aligned along the same direction. In other words, the LED substrates 18 and the LEDs 17 mounted thereon are arranged in rows and columns (in a matrix) in the chassis 14 such that the X axis direction (the long side direction of the chassis 14 and the LED substrates 18) is the row direction and the Y axis direction (the short side direction of the chassis 14 and the LED substrates 18) is the column direction. Specifically, there are 27 LED substrates 18 in total in the chassis 14, with three each in the X axis direction and nine each in the Y axis direction. In the present embodiment, two types of LED substrates 18 are used in which the long side dimensions and the number of LEDs 17 mounted thereon are different. Specifically, one type of the LED substrates 18 has six LEDs 17 mounted thereon and is relatively long, and the other type of the LED substrate 18 has five LEDs 17 mounted thereon and is relatively short. One of the long type of LED substrate with six LEDs 17 is arranged on each side in the X axis direction of the chassis 14, and one of the short type of the LED substrate with five LEDs 17 thereon is arranged in the center of the chassis 14 in the X axis direction. The respective LED substrates 18 that form a row by being aligned along the X axis direction as described above are electrically connected to each other by the adjacent connectors 18a thereof fitting with each other. These connectors 18a corresponding to both edges in the X axis direction of the chassis 14 are also electrically connected to an external control circuit (not shown). This allows the respective LEDs 17 arranged on the respective LED substrates 18 and forming a single row to be connected in series and also allows the lighting of the large number of LEDs 17 included in this single row to be controlled by a single control circuit. Even though the different types of LED substrates 18 differ in the long side dimensions thereof and the number of LEDs 17 mounted thereon, the short side dimensions and the array pitch of the LEDs 17 are approximately the same.

In this manner, the following effects can be obtained by preparing a plurality of these types of LED substrates 18 in which the long side dimensions and number of LEDs 17 differ and using a method to suitably combine these different types of LED substrates 18. In other words, when manufacturing many different types of liquid crystal display devices 10 with different screen sizes, the process can be handled with ease by determining which type of LED substrate 18 to use and suitably modifying the number of LED substrates 18 of each type in accordance with the respective screen sizes. Therefore, the types of LED substrates 18 required can be substantially reduced and manufacturing costs can be lowered more than if custom-designed LED substrates having approximately the same long side dimensions as the chassis 14 were prepared for each screen size.

The diffusion lenses 40 are made of a synthetic resin material (such as polycarbonate or acrylic, for example) that is almost completely transparent (having a high light transmittance) and that has a refractive index higher than the air. As shown in FIG. 9, the diffusion lens 40 is constituted of attachment legs 41 serving as the attachment portions of the diffusion lens 40 to the LED substrates 18, and a lens part 42 that is supported by the attachment legs 41 and that extends in an eave-shape from the attachment legs 41. As shown in FIG. 3, the diffusion lens 40 is attached to the LED substrate 18 so as to cover the front side of the LED 17, or in other words, so as to be placed over the LED 17 in a plan view. In other words, the diffusion lenses 40 are arranged in 9 rows and 17 columns in a manner similar to the LEDs 17 while the LED substrates 18 are attached to the bottom plate 14a of the chassis 14. The diffusion lens 40 can diffuse light having great directivity from the LEDs 17 and then output this light. This makes it possible to reduce the number of LEDs 17 that need to be provided. The diffusion lenses 40 are sufficiently larger than the LEDs 17 in both the X axis direction and the Y axis direction. However, the diffusion lenses 40 are smaller than the LED substrates 18 in the X axis direction and the Y axis direction. Accordingly, the LED substrates 18 are arranged in areas that will overlap with the respective diffusion lenses 40 in the Z axis direction.

Figure 8:
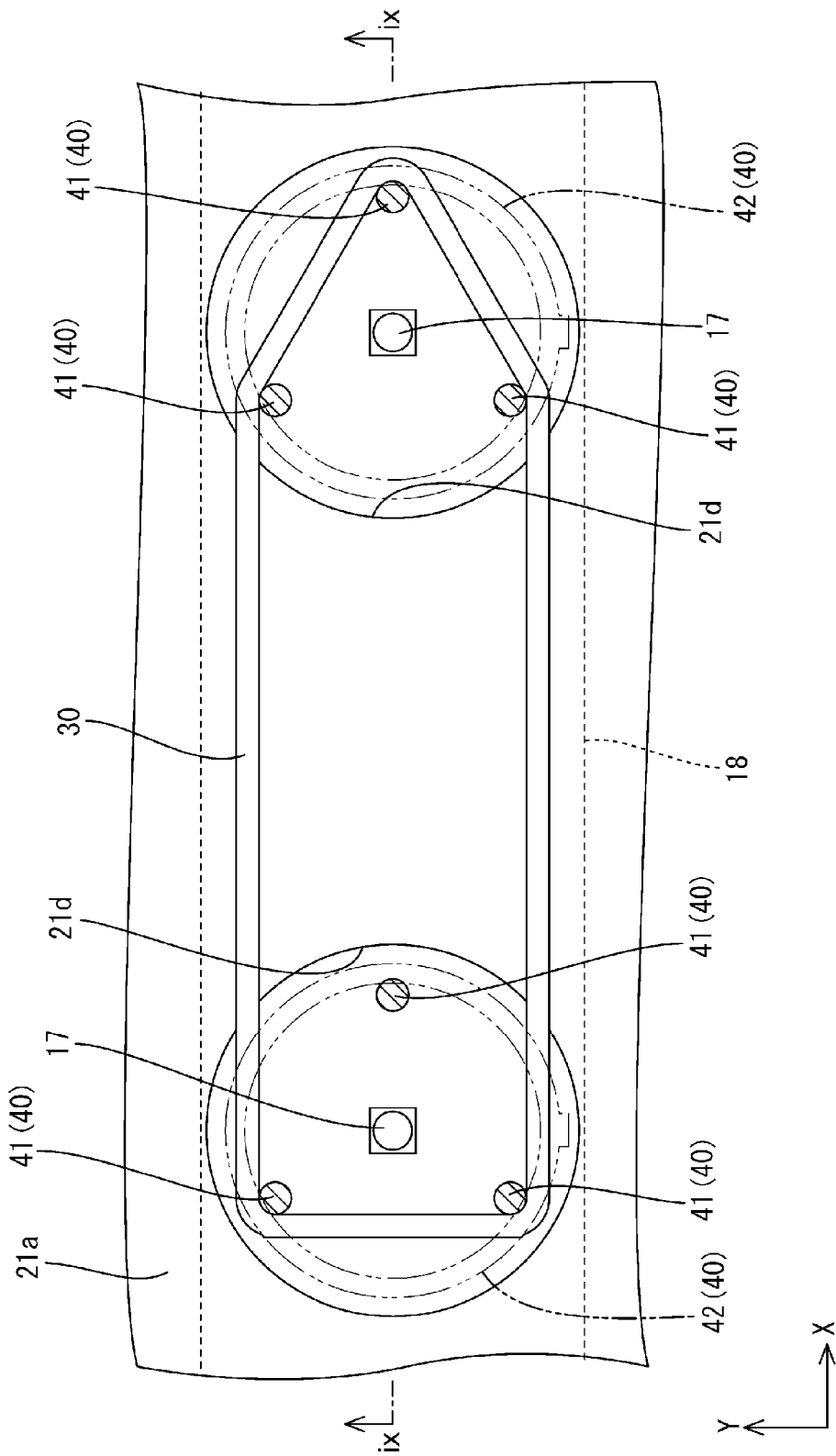
FIG. 8 is a cross-sectional view in which attachment legs of the diffusion lenses and the reflective sheet holding members have been enlarged (lens part omitted).

The attachment legs 41 have a column shape and protrude towards the LED substrates 18 from the lens part 42. As shown in FIG. 8, three of the attachment legs 41 are arranged at locations of the lens part 42 that are closer to the outer edge than a light-receiving-side recess 42c, and the respective attachment legs 41 are arranged so as to approximately form an equilateral triangle in a plan view. The tips of the respective attachment legs 41 are fixed to the LED substrate 18 by an adhesive agent or the like. The diffusion lenses 40 are arranged such that the three attachment legs 41 surround the respective LEDs 17 while attached to the LED substrate 18. The respective diffusion lenses 40 attached to one LED substrate 18 are arranged to have the same orientation. Specifically, one of the three attachment legs 41 is arranged in the center of the widthwise direction of the LED substrate 18, and the other two attachment legs 41 are symmetrical with respect to a line passing through the center of the widthwise direction as the axis.

The lens part 42 is substantially circular in a plan view and is approximately concentric to the LED 17. The surface of the lens part 42 facing the LED substrate 18 is a light-receiving surface 41a where light from the LED 17 is received, whereas the surface of the lens part 42 facing the optical members 15 is a light-exiting surface 42b wherefrom light exits. The lens parts 42 is fixed to the LED substrate 18 through the attachment legs 41, thereby forming a prescribed gap between the light-receiving surface 42a and the LED substrate 18. As shown in FIG. 9, the light-receiving surface 42a runs parallel along the plate surface of the LED substrate 18 as a whole, but is at an incline in a plan view due to the light-receiving-side recess 42c being formed in the area overlapping the LED 17. The light-receiving-side recess 42c is substantially conical and approximately concentric to the diffusion lens 40, and is formed in the rear, or in other words, in the side facing the LED 17. The cross-section of the light-receiving-side recess 42c has a substantially reversed "V"-shape and the periphery of the light-receiving-side recess 42c has an inclined face that is inclined with respect to the Z axis direction. Accordingly, the light emitted from the LED 17 that enters the light-receiving-side recess 42c enters into the diffusion lens 40 through the inclined face, but the light enters the diffusion lens 40 by being refracted in a direction going away from the center of the optical axis LA, or in other words, by being refracted in a wide angle in accordance with the degree of tilt of the inclined face.

The light-exiting surface 42b of the lens part 42 has a substantially flattened spherical shape. This makes it possible to emit the light from the diffusion lens 40 while refracting this light in a direction away from the center of the diffusion lens 40, or in other words, in a wide angle at the boundary with the external layer of air. The region of the light-exiting surface 42b that overlaps the LED 17 in a plan view has formed thereon a substantially bowl-shaped light-exiting-side recess 42d. The light-exiting-side recess 42d is substantially bowl-shaped and is formed such that the periphery thereof has a substantially flattened sphere shape serving as a downhill gradient towards the center. The angle of a line that is tangent to the periphery of the light-exiting-side recess 42d with respect to the optical axis LA of the LED 17 is relatively larger than the angle of the inclined face of the light-receiving-side recess 42c with respect to the optical axis LA. By forming the light-exiting-side recess 42d in the area of the light-exiting surface 42b overlapping the LED 17 in a plan view, a large portion of the light from the LED 17 can be emitted while being refracted in a wide angle, or a portion of the light from the LED 17 can be reflected back towards the LED substrate 18.

The reflective sheet 21 is made of a synthetic resin, and the surface thereof is a highly reflective white. As shown in FIG. 3, the reflective sheet 21 is large enough to be laid over the almost entire inner surface of the chassis 14, and therefore, it is possible to cover all of the LED substrates 18 arranged in rows in the chassis 14 from the front side thereof. With the reflective sheet 21, light inside of the chassis 14 can be efficiently directed toward the optical members 15. The reflective sheet 21 is constituted of a bottom section 21a that extends along the bottom plate 14a of the chassis 14 and that is large enough to cover a large portion of the bottom plate 14a, four rising parts 21b that rise from the respective outer edges of the bottom section 21a towards the front side and that are at a slant with respect to the bottom section 21a, and an extending part 21c that extends outward from the outer edges of the respective rising parts 21b and that is placed on the supporting plate 14d of the chassis 14. The bottom section 21a of the reflective sheet 21 is disposed so as to overlap the front surface of the respective LED substrates 18 where the LEDs 17 are mounted. Lens insertion holes 21d (openings) through which the respective diffusion lenses 40 are inserted are formed in the bottom section 21a of the reflective sheet 21 at a location overlapping the respective diffusion lenses 40 (the respective LEDs 17) in a plan view. These lens insertion holes 21d (openings) also expose the respective LEDs 17. As shown in FIG. 8, the lens insertion holes 21d have a circular shape in a plan view and the radial dimensions thereof are set to be larger than the respective diffusion lenses 40. When arranging the reflective sheet 21 in the chassis 14, this makes it possible to reliably fit the respective diffusion lenses 40 into the respective lens insertion holes 21d regardless of deviations in size. Connector insertion holes 21e where the respective connectors 18a are inserted are formed in the bottom section 21a of the reflective sheet 21 at a location overlapping the respective connectors 18a in a plan view.

As shown in FIGS. 4 and 5, each of the rivets 20 has a disk-shaped pressing part 20d, and a locking part 20e that protrudes below the pressing part 20d. Penetrating holes 18b for inserting the respective locking parts 20e are drilled in the LED substrates 18, and attachment holes (not shown) that connect with the respective penetrating holes 18b are drilled in the bottom plate 14a of the chassis 14. The tip of the locking part 20e of the rivet 20 is an elastically deformable wide part and can engage the rear surface of the bottom plate 14a of the chassis 14 after being inserted in the penetrating hole 18b and the attachment hole. This allows the rivet 20 to fix the LED substrate 18 to the bottom plate 14a by pressing the LED substrate 18 with the pressing part 20d. As shown in FIG. 3, a plurality of these rivets 20 are appropriately dispersed throughout the surface of the LED substrate 18, and are adjacent to the respective diffusion lenses 40 (LEDs 17) along the X axis direction. As shown in FIG. 3, there are areas on the LED substrates 18 where the rivets 20 are not provided between the adjacent diffusion lenses 40, and in such places there are no penetrating holes 18b in order to sufficiently ensure the wiring pattern width of the wiring patterns on the LED substrates 18.

As shown in FIGS. 4 and 5, support pins 27 are provided on the surface of rivets 20B, among the rivets 20, near the center of the bottom plate 14a of the chassis 14. The support pins 27 have a conical shape that tapers off, and can support the diffusion plate 15a from below by making point contact with the diffusion plate 15a when the diffusion plate 15a warps downward.

Insertion holes (not shown) for inserting the locking parts 20e of the respective rivets 20 are formed in the reflective sheet 21. The radius of each insertion hole formed in the reflective sheet 21 is smaller than the radius of the pressing part 20d. In other words, the reflective sheet 21 and the LED substrate 18 are sandwiched by the pressing part 20d and the chassis 14 at the edges of the insertion holes and are held to the chassis 14 by the rivets 20.

The reflective sheet holding members 30 will be explained. A shown in FIGS. 8 and 9, the reflective sheet holding member 30 is an elastic looped member with excellent reflective characteristics. In other words, the reflective sheet holding member 30 is a white rubber band member. The length of the circumference of the reflective sheet holding member 30, when not stretched, is shorter than the length required to connect the five attachment legs 41 on the outside among the six attachment legs 41 of the diffusion lenses 40 and 40 that are adjacent in the X axis direction inside the chassis. In other words, in a plan view the length of the circumference of the reflective holding sheet member 30 is shorter than the length of the circumference of the pentagonal shape that has the arrangement part of the five attachment legs 41 as the corners. A width W of the reflective sheet holding member 30 is substantially the same as a distance L between the sheet surface of the reflective sheet 21 and the eave-shaped light-receiving surface 42a of the lens part 42 facing the sheet surface.

As shown in FIGS. 8 and 9, the reflective sheet holding member 30 engages the diffusion lenses 40 and 40 that are adjacent to each other in the X axis direction inside the chassis 14. Specifically, the reflective sheet holding member 30 is arranged such that the circumference thereof is stretched to encompass the diffusion lenses 40 and 40, and the reflective sheet holding member 30 is engaged to the attachment legs 41 by elastic force contracting in the circumferential direction. At this time, the reflective sheet holding member 30 forms a pentagonal shape in a plan view along the arrangement shape of the five attachment legs 41 described above. The reflective sheet holding member 30 engages the portion of the lens part 42 protruding in an eave-shape in the width direction (Z axis direction). The reflective sheet holding member 30 closely adheres to the light-receiving surface 42a of the lens part 42 at the portion overlapping the diffusion lens 40, and also closely adheres to the sheet surface of the top (opposite to the chassis 14) of the reflective sheet 21 between the adjacent lens insertion holes 21d. In other words, the reflective sheet holding member 30 presses the edges of the lens insertion holes 21d from the lens part 42 side (the side opposite to the chassis 14).

Next, the arrangement configuration of the reflective sheet holding member 30 inside the chassis 14 will be described. First, among the diffusion lenses 40 that are arranged in 9 rows and 17 columns, the reflective sheet holding members 30 respectively engage diffusion lenses 40E located at the edges of the row direction (X axis direction), or namely, in the first column and seventeenth column, and also respectively engage the diffusion lenses 40 that are adjacent thereto. The reflective sheet holding members 30 also respectively engage the diffusion lenses 40 and 40 that are in the third column and fourth column and the diffusion lenses 40 and 40 that are in the fourteenth column and fifteenth column where the rivets 20 are not provided between the diffusion lenses 40 and 40.

The reflective sheet holding members 30 also respectively engage the diffusion lenses 40 and 40 that are in the sixth column and seventh column and the diffusion lenses 40 and 40 that are in the eleventh column and twelfth column where the connectors 18a are provided between the diffusion lenses 40 and 40.

Figure 6:
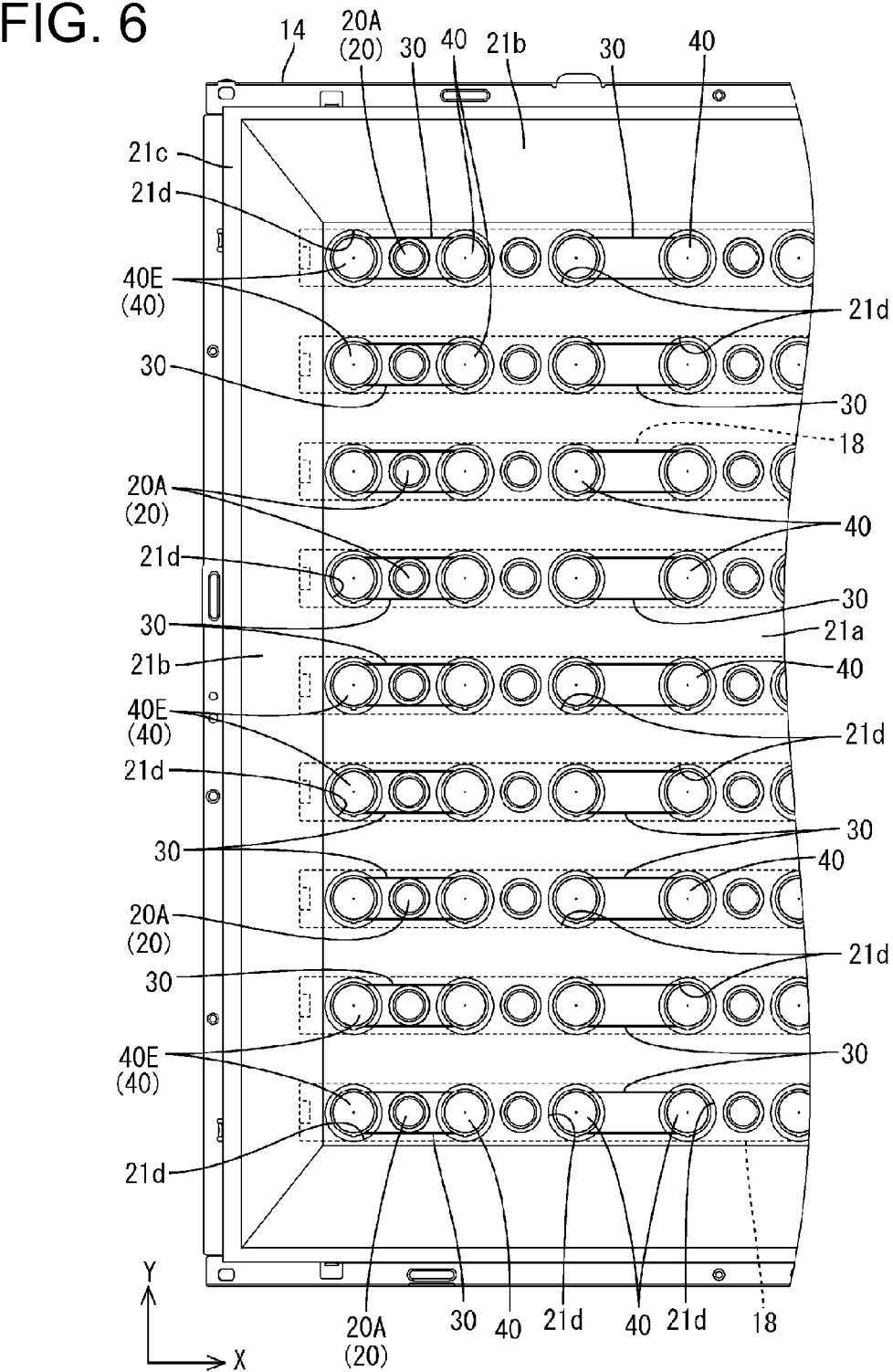
FIG. 6 is a plan view in which an arrangement of reflective sheet holding members on an edge of the reflective sheet has been enlarged.

As shown in FIG. 6, the reflective sheet holding members 30 that respectively engage the diffusion lenses 40E and 40 in the first column and second column press the edges of the reflective sheet insertion holes 21d, which is where the diffusion lenses 40E in the first column are inserted, towards the bottom plate of the chassis 14 at two locations. Rivets 20A are respectively provided between the diffusion lenses 40E and 40 in the first column and second column, but the reflective sheet holding member 30 holds the reflective sheet 21 to the chassis 14 at the edges of the reflective sheet 21 from the rivets 20A. The rivets 20A are arranged in the periphery of the respective looped reflective sheet holding members 30, and the rivets 20A and the reflective sheet holding members 30 do not interfere with each other. The reflective sheet holding members 30 respectively engaging the diffusion lenses 40 and 40E in the sixteenth column and seventeenth column are symmetrical with the reflective sheet holding members 30 respectively engaging the diffusion lenses 40E and 40 in the first column and second column, and thus, an explanation thereof will be omitted.

As shown in FIG. 6, the reflective sheet holding members 30 respectively engaging the diffusion lenses 40 and 40 in the third column and fourth column hold the area between the lens insertion holes 21d and 21d, which is where the diffusion lenses 40 and 40 in the third column and fourth column not held by rivets 20 are inserted, to the chassis 14. The reflective sheet holding members 30 respectively engaging the diffusion lenses 40 and 40 in the fourteenth column and fifteenth column have a similar arrangement configuration to the reflective sheet holding members 30 respectively engaging the diffusion lenses 40 and 40 in the third column and fourth column, and thus, an explanation thereof will be omitted.

Figure 7:
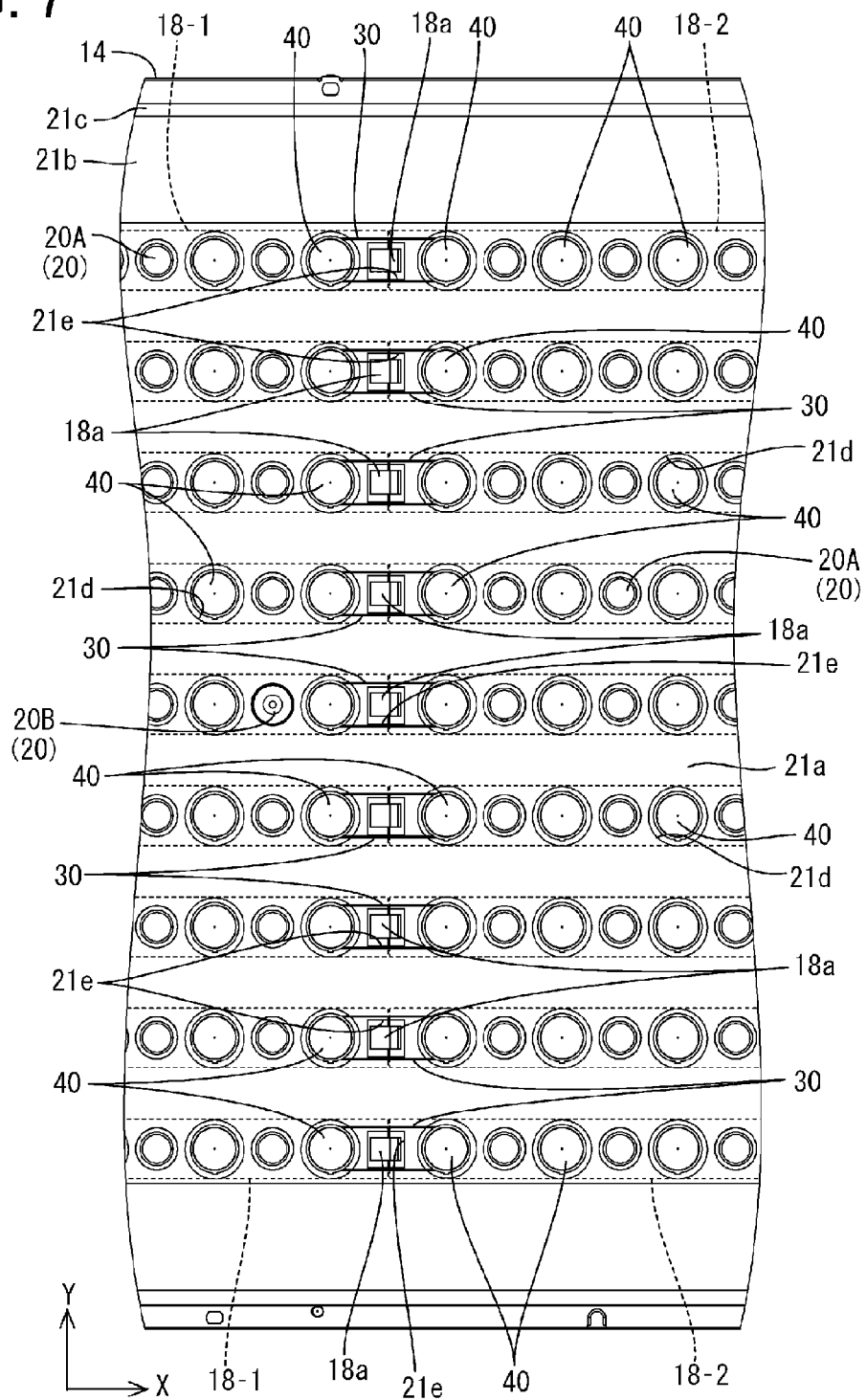
FIG. 7 is a plan view in which an arrangement of connector insertion holes and reflective sheet holding members has been enlarged.

As shown in FIG. 7, the reflective sheet holding members 30 respectively engaging the diffusion lenses 40 and 40 in the sixth column and seventh column hold the area between the lens insertion holes 21d and 21d, which is where the diffusion lenses 40 and 40 in the sixth column and seventh column not held by the rivets 20 are inserted, to the chassis 14. The diffusion lenses 40 in the sixth column are fixed to an LED substrate 18-1 arranged on the left side among the three LED substrates 18 arranged in the X axis direction, and the diffusion lenses 40 in the seventh column are fixed to an LED substrate 18-2 arranged in the center among the three LED substrates 18 arranged in the X axis direction. The LED substrate 18-1 is connected to the LED substrate 18-2 through the connector 18a. The connector insertion holes 21e for respectively inserting the connectors 18a are formed in the reflective sheet 21 between the lens insertion holes 21d and 21d, which are for respectively inserting the diffusion lenses 40 and 40 in the sixth column and seventh column. The reflective sheet holding members 30 are arranged so as to respectively overlap the edges of the connector insertion holes 21e. The connectors 18a are arranged in the periphery of the respective looped reflective sheet holding members 30, and the connectors 18a and the reflective sheet holding members 30 do not interfere with each other. The reflective sheet holding members 30 respectively engaging the diffusion lenses 40 and 40 in the eleventh column and twelfth column have a similar arrangement configuration to the reflective sheet holding members 30 respectively engaging the diffusion lenses 40 and 40 in the sixth column and seventh column, and thus, and an explanation thereof will be omitted.

The backlight device 12 of the present embodiment includes: a plurality of the LEDs 17; the chassis 14 that is a plate-shaped member and on which the LEDs 17 are arranged; a plurality of the diffusion lenses 40 that are fixed to the chassis 14, that individually cover the LEDs 17 from the side opposite to the chassis 14, and that apply optical effects on the light from the LEDs 17; the reflective sheet 21 that covers the plate surface of the chassis 14, that exposes the LEDs 17, and that has the lens insertion holes 21 through which the diffusion lenses 40 are respectively inserted; and the reflective sheet holding members 30 that hold the reflective sheet 21 from the side opposite to the chassis 14, that engage the adjacent diffusion lenses 40 and 40, and that extend on the sheet surface of the reflective sheet 21 between the adjacent diffusion lenses 40 and 40.

In the backlight device 12 of the present embodiment, the reflective sheet holding members 30 engage the respective diffusion lenses 40 fixed to the chassis 14 and extend on the sheet surface of the reflective sheet 21 between the adjacent diffusion lenses 40 and 40; therefore, the reflective sheet 21 can be held from the side opposite to the chassis 14 along the space between the adjacent lens insertion holes 21d and 21d of the reflective sheet 21. As a result, warping of the edges of the openings of the respective lens insertion holes 21d can be controlled, the reflective sheet 21 can be held to the chassis 14, and the occurrence of uneven brightness can be reduced.

Specifically, the edges of the lens insertion holes 21d are formed closest to the LEDs 17 in the reflective sheet 21 and are susceptible to expanding and contracting due to heat from the LEDs 17. If the edges of the lens insertion holes 21d expand and contract, then there is a risk that the side of these holes opposite to the chassis 14 could warp and become deformed, and that this warped portion could intrude above the optical path of the light from the LEDs 17, thereby creating a shadow. In the present embodiment, however, the reflective sheet holding member 30 presses the edges of the lens insertion holes 21d from the side opposite to the chassis 14, and this makes it possible to suppress warping of the edges of the lens insertion hole 21d openings.

The bottom section 21a of the reflective sheet 21 covers the bottom plate 14a of the chassis 14; however, sometimes level differences or recesses and protrusions can form in the surface where the bottom section 21a of the reflective sheet 21 is arranged due to deviations in size or assembling of the respective members. When the bottom section 21a of the reflective sheet 21 is arranged on such a surface, there is a risk that these level differences or recesses and protrusions could cause a portion of the reflective sheet 21 to rise up from the chassis 14 and that light from the LEDs 17 could enter the rear surface side of the reflective sheet 21. In the present embodiment, however, the reflective sheet holding members 30 press the reflective sheet 21 from the side opposite to the chassis 14 and prevent the reflective sheet 21 from rising up in this manner.

In the present embodiment, the LED substrates 18 are provided fixed to the chassis 14 and the LEDs 17 are mounted thereon, and the diffusion lenses 40 are also fixed to these LED substrates 18. Therefore, by fixing the LED substrates 18 to the chassis 14, the diffusion lenses 40 can be fixed to the chassis 14 with ease. Specifically, by adhering the diffusion lenses 40 to the LED substrates 18 and fixing the LED substrates 18 to the chassis 14 by the rivets 20, the fixing of the diffusion lenses 40 to the chassis 14 can be achieved.

In the present embodiment, the diffusion lenses 40 have the column-shaped attachment legs 41 that attach to the respective LED substrates 18, and the reflective sheet holding members 30 engage the attachment legs 41. As a result, the reflective sheet holding members 30 can engage the respective diffusion lenses 40 with ease.

In the present embodiment, each of the diffusion lenses 40 has the lens part 42 that is supported by the attachment legs 41 and that extends in an eave-shape from the attachment legs 41. The respective reflective sheet holding members 30 engage the lens part 42. Thus, falling of the respective reflective sheet holding members 30 towards the lens part 42 of the respective diffusion lenses 40 can be suppressed.

In the present embodiment, the width of the reflective sheet holding members 30 is substantially the same as the gap between the sheet surface of the reflective sheet 21 and the light-receiving surface 42a of the lens part 42 facing this sheet surface. Therefore, the lens part 42 can position the reflective sheet holding member 30 with respect to the reflective sheet 21, and the reflective sheet 21 can be suitably held.

In the present embodiment, the reflective sheet holding members 30 are elastic looped members that surround the adjacent diffusion lenses 40 and 40 and that engage the diffusion lenses 40 by elastic force contracting in the circumferential direction. Thus, the reflective sheet holding members 30 can reliably engage the diffusion lenses 40 due to this elastic force, and a suitable holding of the reflective sheet 21 can be achieved.

In the present embodiment, among the diffusion lenses 40 arranged in rows and columns, the reflective sheet holding members 30 engage the diffusion lenses 40E that are located at the edges thereof. As a result, it is possible to mitigate the rising of the edges of the reflective sheet 21 even if members to hold the reflective sheet 21 such as rivets are not provided on the edges of the reflective sheet 21 due to the frame of the backlight device 12 being made narrower.

In the present embodiment, among the adjacent diffusion lenses 40 and 40, the LED substrate 18 is constituted of the LED substrate 18-1 to which one set of the diffusion lenses 40 is fixed, and the other LED substrate 18-2 to which another set of the diffusion lens 40 is fixed. Such a configuration allows the rising of the reflective sheet 21 caused by level differences to be suppressed by the reflective sheet holding members 30 even if the level differences occur between the two LED substrates 18-1 and 18-2 due to deviations in size or warping of these two LED substrates 18-1 and 18-2.

In the present embodiment, the reflective sheet holding members 30 are arranged so as to overlap the respective edges of the connector insertion holes 21e; thus, it is possible to suppress the rising of the reflective sheet 14 at the edges of the connector insertion holes 21e.

In the present embodiment, the optical elements are diffusion lenses 40 that diffuse light from the LEDs 17, and thus, uneven brightness can be markedly reduced.

<Embodiment 2>

Embodiment 2 of the present invention will be described with reference to FIGS. 10 and 11. In Embodiment 2, a reflective sheet holding member 130 that has a different configuration than the reflective sheet holding member 30 is shown. Descriptions of structures, operations, and effects similar to those of Embodiment 1 will be omitted.

Figure 10:
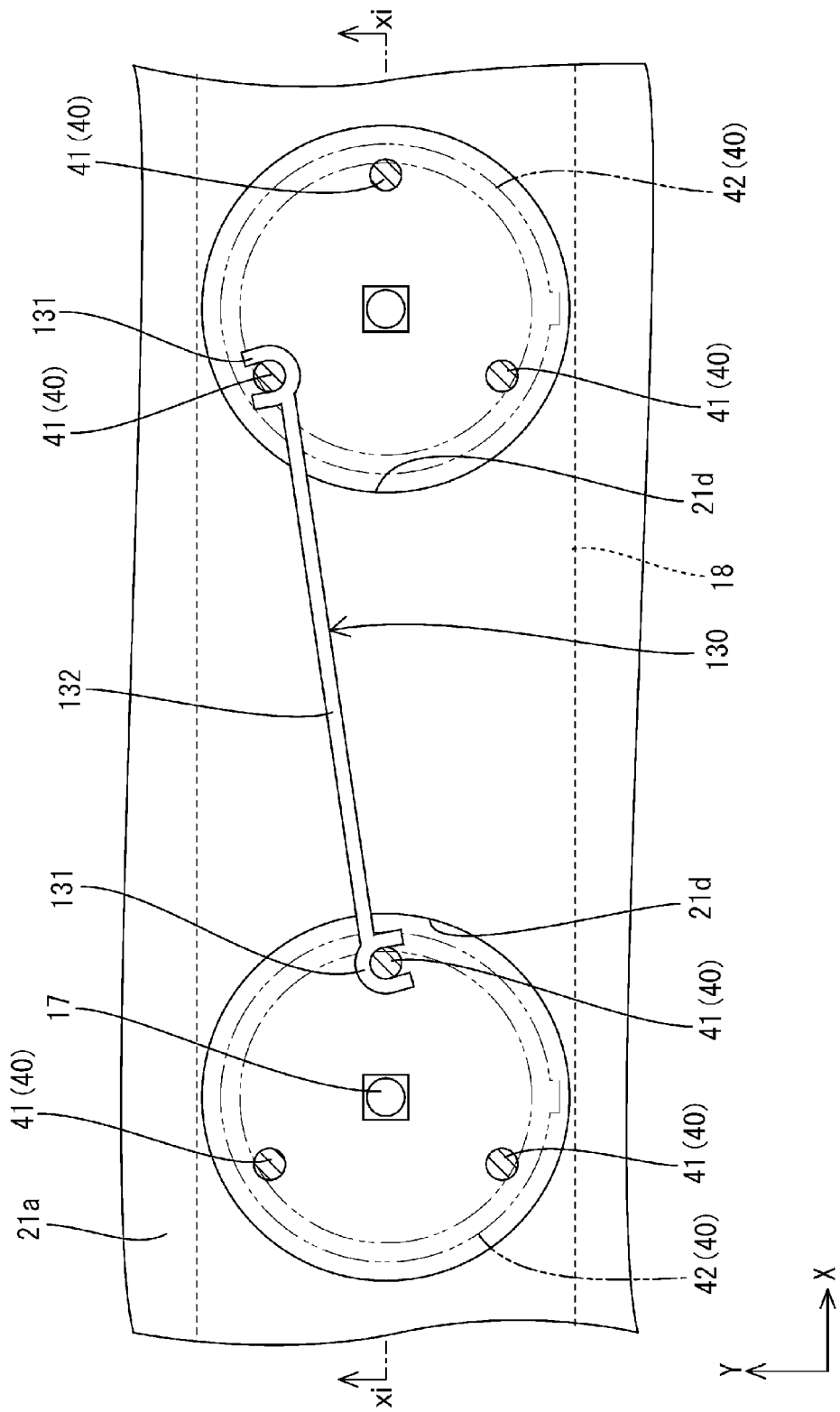
FIG. 10 is a cross-sectional view in which attachment legs of diffusion lenses and a reflective sheet holding member of Embodiment 2 have been enlarged (lens part omitted).
Figure 11:
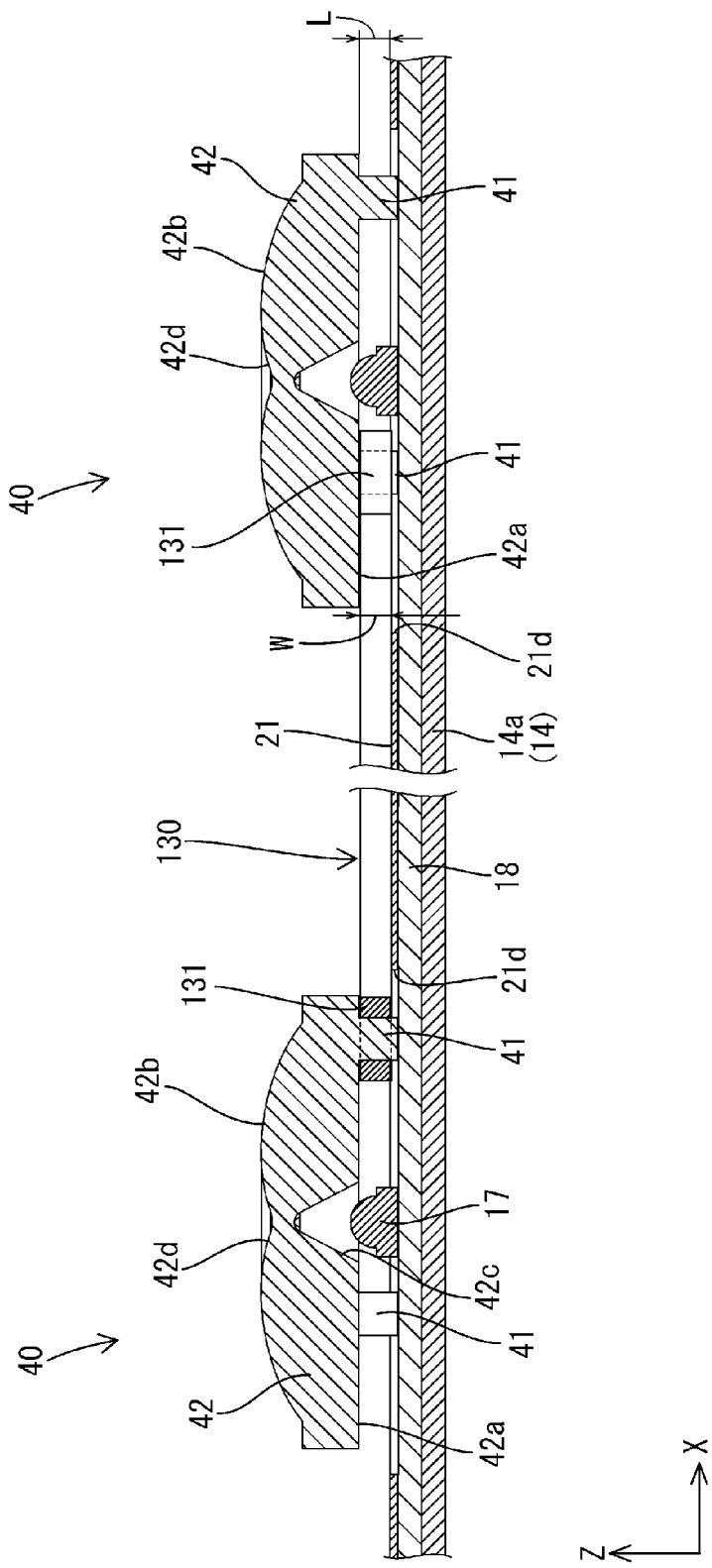
FIG. 11 is a cross-sectional view of FIG. 10 along the line xi-xi.

As shown in FIGS. 10 and 11, the reflective sheet holding member 130 is made of a synthetic resin such as plastic with excellent reflecting characteristics. The reflective sheet holding member 130 has two gripping parts 131 and 131 that are arranged at the respective ends thereof and that grip the periphery of attachment legs 41, and a sheet pressing part 132 that connects the two gripping parts 131 and 131. The gripping parts 131 have a "U"-shape that opens in the direction intersecting the length direction of the reflective sheet holding member 130, or more specifically, the direction perpendicular to this length direction. The width of the inner peripheries of the gripping parts 131 matches the diameter of the attachment legs 41. The openings of the two gripping parts 131 and 131 face mutually opposite directions. The lengthwise size of the reflective sheet holding member 130 is the same as the gap between the attachment legs 41 and 41 respectively held by the two gripping parts 131 and 131. A width W of the reflective sheet holding member 130 is substantially the same size as a distance L between the sheet surface of the reflective sheet 21 and an eave-shaped light-receiving surface 42a of a lens part 42 facing the sheet surface.

As shown in FIGS. 10 and 11, the reflective sheet holding member 130 engages diffusion lenses 40 and 40 that are adjacent to each other in the X axis direction inside a chassis 14. Specifically, among the three attachment legs 41 of the respective diffusion lenses 40, the gripping parts 131 and 131 of the reflective sheet holding member 30 respectively grip the attachment legs 41 closest to the adjacent diffusion lenses 40. The reflective sheet holding member 130 engages a portion of the lens part 42 protruding in an eave-shape in the width direction (Z axis direction) The reflective sheet holding member 130 abuts the light-receiving surface 42a of the lens part 42 at a portion overlapping the diffusion lens 40, and abuts the sheet surface of the top (the side opposite to the chassis 14) of the reflective sheet 21 between adjacent lens insertion holes 21d. In other words, the reflective sheet holding member 130 presses the edges of the lens insertion holes 21d from the lens part 42 side (the side opposite to the chassis 14).

In the present embodiment, the reflective sheet holding member 130 has the two gripping parts 131 and 131 that are arranged at the respective ends thereof and that grip the periphery of the respective attachment legs 41, and the sheet pressing part 132 that connects the two gripping parts 131 and 131. Thus, the reflective sheet 21 can reliably engage the diffusion lenses 40 due to the gripping parts 131, the reflective sheet 21 can be held by the sheet pressing part 132, and a suitable holding of the reflective sheet 21 can be achieved.

<Embodiment 3>

Embodiment 3 of the present invention will be described with reference to FIG. 12. In Embodiment 3, a reflective sheet holding member 230, which is a modification of the configuration of the reflective sheet holding member 130 of Embodiment 2, is shown. Descriptions of structures, operations, and effects similar to those of the embodiments described above will be omitted.

Figure 12:
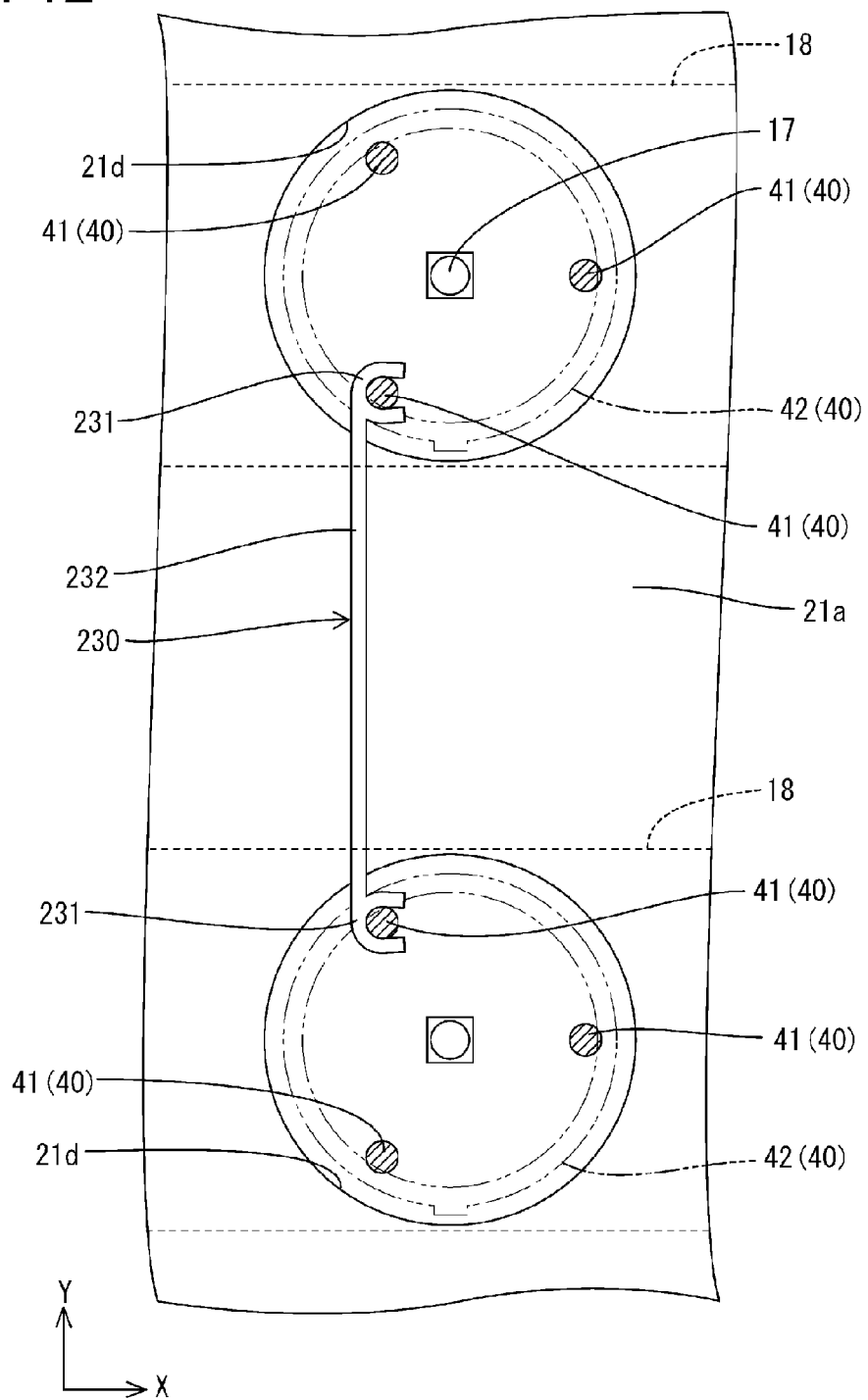
FIG. 12 is a cross-sectional view in which attachment legs of diffusion lenses and a reflective sheet holding member of Embodiment 3 have been enlarged (lens part omitted).

As shown in FIG. 12, the reflective sheet holding member 230 is made of a synthetic resin such as plastic with excellent reflecting characteristics, and has two gripping parts 231 and 231 that are arranged at the respective ends thereof and that grip the periphery of respective attachment legs 41, and a sheet pressing part 232 that connects the two gripping parts 231 and 231. The gripping parts 231 have a "U"-shape that opens in the direction intersecting the length direction of the reflective sheet holding member 230, or more specifically, the direction perpendicular to this length direction. The width of the inner peripheries of the gripping parts 231 and 231 matches the diameter of the attachment legs 41. The openings of the two gripping parts 231 and 231 face the same direction. The lengthwise size of the reflective sheet holding member 230 is the same as the gap between the attachment legs 41 and 41 respectively held by the two gripping parts 231 and 231.

As shown in FIG. 12, the reflective sheet holding member 230 engages diffusion lenses 40 and 40 that are adjacent to each other in the Y axis direction inside a chassis 14. The adjacent diffusion lenses 40 and 40 are each fixed to a different LED substrate 18.

In the present embodiment, the two gripping parts 231 and 231 engage the reflective sheet holding member 230, and diffusion lenses 40 and 40 thus engaged do not exhibit elastic force in the direction approaching each other, as in the reflective sheet holding member 30 in Embodiment 1. Thus, there is no risk that the elastic force of the reflective sheet holding members 230 will cause the LED substrates 18 to move out of position in the chassis 14, even if the diffusion lenses 40 and 40 fixed to different LED substrates 18 are engaged.

<Embodiment 4>

Figure 13:
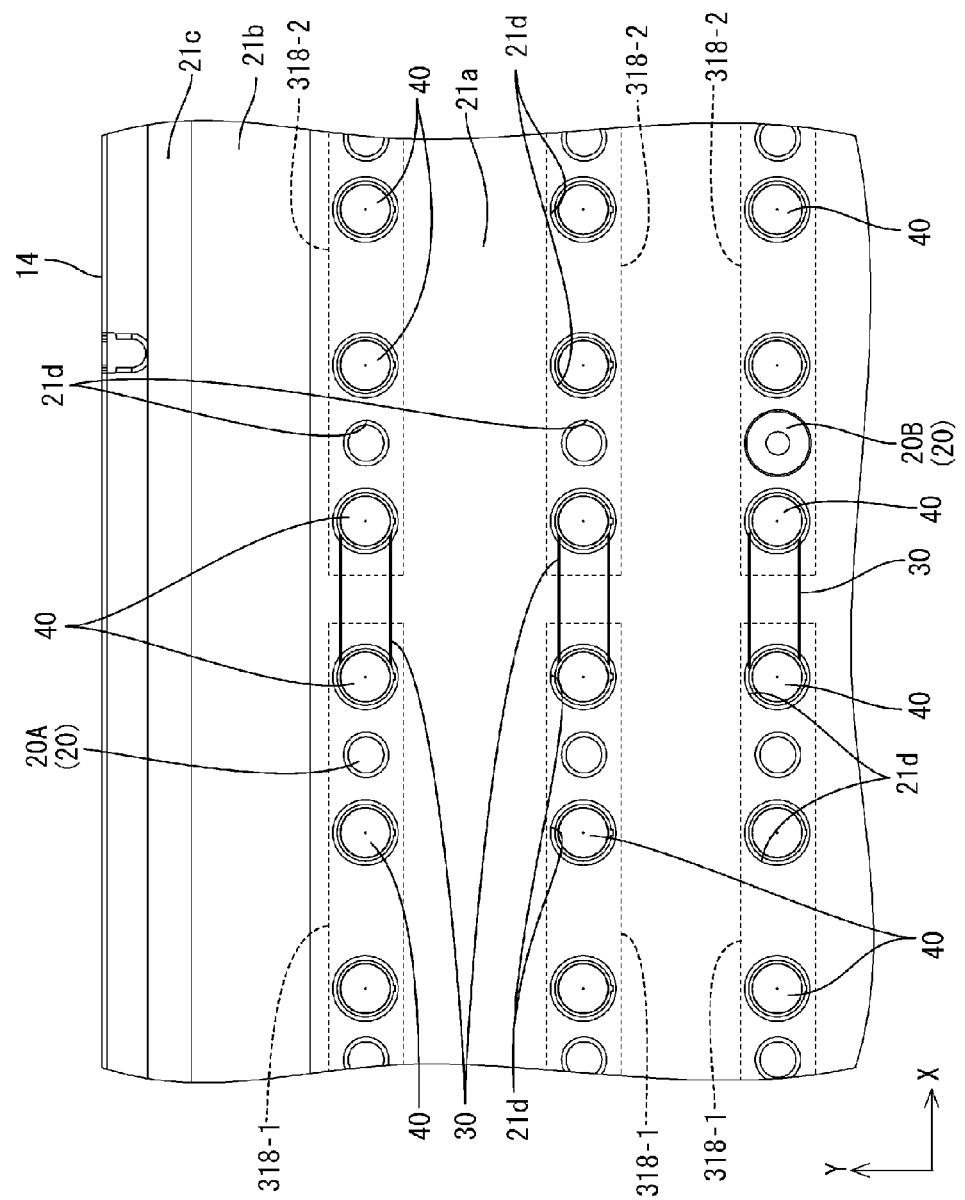
FIG. 13 is a plan view in which an arrangement of reflective sheet holding members near edges of LED substrates of Embodiment 4 has been enlarged.

Embodiment 4 of the present invention will be described with reference to FIG. 13. In Embodiment 4, LED substrates 318-1 and 318-2 that have a different configuration than the LED substrate 18 are shown. Descriptions of structures, operations, and effects similar to those of the embodiments described above will be omitted.

In the present embodiment, reflective sheet holding members 30 are held on the chassis 14 between respective lens insertion holes 21d and 21d where diffusion lenses 40 and 40 that are arranged in the middle portion not held by rivets 20 are inserted. Among the diffusion lenses 40 and 40, the diffusion lenses 40 on the left side are fixed to the LED substrate 318-1 arranged on the left side in the X axis direction. Among the diffusion lenses 40 and 40, the diffusion lenses 40 on the right side are fixed to the LED substrate 318-2 arranged on the right side in the X axis direction. The LED substrate 318-1 and the LED substrate 318-2 are not connected through a connector or the like. In other words, the opposing edges of the LED substrate 318-1 and the LED substrate 318-2 are not connected to each other.

In the present embodiment, a reflective sheet 21 can be held by the reflective sheet holding members 30 at the portion not held by the rivets 20 between the two LED substrates.

<Embodiment 5>

Figure 14:
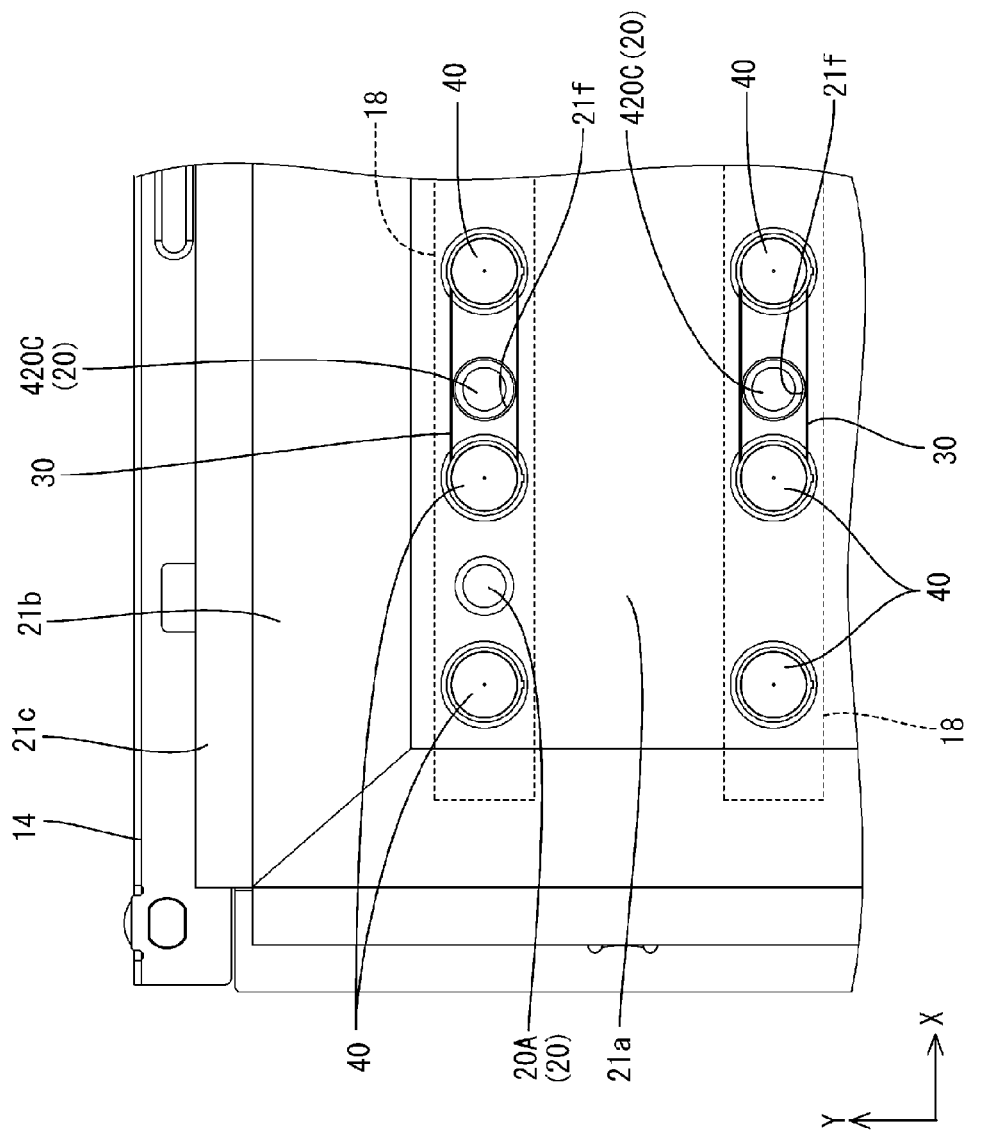
FIG. 14 is a plan view in which an arrangement of a rivet insertion hole and reflective sheet holding members of Embodiment 5 has been enlarged.

Embodiment 5 of the present invention will be described with reference to FIG. 14. In Embodiment 5, a rivet 20 includes a rivet 420C that does not hold a reflective sheet 21 to a chassis 14. Descriptions of structures, operations, and effects similar to those of the embodiments described above will be omitted.

Among the rivets 20, the rivet 420C is similar to a rivet 20A, but differs from the rivet 20A in that rivet insertion holes 21f formed for the rivet 420C have a larger radius than respective pressing parts 20d. In other words, the rivet 20A holds the reflective sheet 21 with the pressing part 20d and the chassis 14, whereas the pressing part 20d of the rivet 420C is inserted into the rivet insertion hole 21f formed in the reflective sheet 21 and does not hold the reflective sheet 21 to the chassis 14. LED substrates 18 can be temporarily attached to the chassis 14 by the rivets 420C before the reflective sheet 21 has been arranged in the chassis 14. The pressing part 20d of the rivet 420C is inserted into the rivet insertion hole 21f in the reflective sheet 21, thereby making it possible to prevent the reflective sheet 21 and the pressing part 20d from interfering with each other.

In the present embodiment, the reflective sheet holding members 30 hold to the chassis 14 the space between the lens insertion holes 21d and 21d that are not held by rivets 20A or the like and where the diffusion lenses 40 and 40 positioned in the second column and third column from the left are respectively inserted. The rivet insertion holes 21f where the respective rivets 420C are inserted are formed in the reflective sheet 21 between the lens insertion holes 21d and 21d where the diffusion lenses 40 and 40 positioned in the second column and third column are respectively inserted. The reflective sheet holding members 30 are arranged so as to respectively overlap the edges of the rivet insertion holes 21f.

In the present embodiment, the rising of the reflective sheet 21 at the edges of the rivet insertion holes 21f can be suppressed.

Other Embodiments

The present invention is not limited to the embodiments shown in the drawings and described above, and the following embodiments are also included in the technical scope of the present invention, for example.

(1) In the respective embodiments above, an example was shown in which the width W of the reflective sheet holding members 30 and 130 is substantially the same as the gap L between the sheet surface of the reflective sheet 21 and the light-receiving surface 42a of the lens part 42, but the width W of the reflective sheet holding member may be smaller than L. In this case, the effect of the reflective sheet holding member on the optical path of light from the LEDs 17 can be reduced.

(2) In the respective embodiments above, an example was shown in which the reflective sheet holding members 30 and 130 closely adhere to or abut the sheet surface of the reflective sheet 21, but the reflective sheet holding members 30 and 130 are not limited thereto. The reflective sheet holding members may be provided with the sheet surface of the reflective sheet with a gap therebetween such that the reflective sheet is pressed towards the chassis when the reflective sheet rises towards the side that is opposite to the chassis.

(3) In the respective embodiments above, an example was shown in which the reflective sheet holding member 30 is engaged to the diffusion lens 40 by elastic force, but the reflective sheet holding member 30 may be engaged to the diffusion lenses 40 by other means, such as an adhesive agent.

(4) In the respective embodiments above, an example was shown with the reflective sheet holding members 30 and 130 engaged by the diffusion lenses 40 and 40 adjacent in the X axis direction and the reflective sheet holding member 230 engaged by the diffusion lenses 40 and 40 adjacent in the Y axis direction, but without being limited thereto, the reflective sheet holding members may be engaged by diffusion lenses adjacent in an inclined direction in the lengthwise direction of the LED substrates 18, for example.

(5) In the respective embodiments above, the reflective sheet holding members engaged the diffusion lenses 40 and 40 arranged in prescribed columns in all of the rows, but a configuration may be adopted in which the arrangement occurs only in prescribed rows, for example. The reflective sheet holding members do not need to have an engaged area in advance, and may suitably engage an area of the reflective sheet identified as rising up in an inspection or the like after the reflective sheet has been attached.

(6) In the respective embodiments above, an example was shown in which the attachment legs 41 are column-shaped, but without being limited thereto, the shape may be prismatic or a cylindrical shape or the like that surrounds the respective LEDs.

(7) In the respective embodiments above, an example was shown in which three of the attachment legs 41 are disposed in an arrangement forming an equilateral triangle, but the number or arrangement of the attachment legs are not limited thereto.

(8) In the respective embodiments above, an example was shown in which the lens part 42 is a shape extending in an eave-shape from the attachment legs, but the shape of the lens part is not limited thereto.

(9) In the respective embodiments above, an example was shown in which the optical elements are diffusion lenses 50 and 250, but the optical elements are not limited thereto. The optical elements may be any object that exerts an optical effect on light from the light sources, and may be a condensing lens or the like, for example.

(10) In the respective embodiments above, an example was shown in which the LED substrate was divided, but the LED substrate may be a single substrate, or may be formed by a plurality of rectangular LED substrates having LEDs arranged in rows and columns thereon being combined together.

(11) In the respective embodiments above, an explanation was given in which a five LED type LED substrate, a six LED type LED substrate, and an eight LED type LED substrate are suitably combined together, but an LED substrate with a number of LEDs mounted thereon other than five, six, or eight is also included in the present invention.

(12) In the respective embodiments above, an example was shown in which the light source is an LED, but a light source other than an LED may be used. Instead of LEDs, a linear light source such as a cold cathode fluorescent tube or a hot cathode fluorescent tube, or a planar light source such as organic EL may be used, for example.

(13) In the respective embodiments above, an example was shown in which the optical sheet 15b included a diffusion sheet that functions to diffuse light, a lens sheet that functions to condense light, and the like, but an optical sheet that has the combined functions of condensing light and diffusing light may be used.

(14) In the respective embodiments above, an example was shown in which the device is placed upright with the shorter side direction of the liquid crystal panel and the chassis corresponding to the vertical direction, but a configuration in which the device is placed upright with the longer side direction of the liquid crystal panel and the chassis corresponding to the vertical direction is also included in the present invention.

(15) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(16) In the respective embodiments above, a liquid crystal display device using a liquid crystal panel as a display panel was described as an example, but the present invention can be applied to a display device that uses another type of display panel.

(17) In the respective embodiments above, a television receiver that includes a tuner was illustratively shown, but the present invention is also applicable to a display device without a tuner.

DESCRIPTION OF REFERENCE CHARACTERS

10 liquid crystal display device (display device)
11 liquid crystal panel (display panel)
12 backlight device (illumination device)
14 chassis
15 optical members
17 LED (light source)
18, 318 LED substrate (light source substrate)
18a connector
20 rivet
21 reflective sheet
21b lens insertion hole (opening)
21e connector insertion hole
21f rivet insertion hole
30, 130, 230 reflective sheet holding member
40 diffusion lens (optical element)
41 attachment leg
42 lens part
42a light-receiving surface
131, 232 gripping part
132, 232 sheet pressing part
420C rivet
TV television receiver

The invention claimed is:

1. An illumination device, comprising:
a plurality of light sources;
a chassis that is a plate-shaped member having the light sources mounted on a surface thereof;
a plurality of optical elements mounted on the chassis to respectively cover the light sources, the optical elements applying an optical effect on light from the light sources;
a reflective sheet covering the surface of the chassis and exposing the light sources, the reflective sheet having openings through which the optical elements are inserted; and
holding members that hold the reflective sheet from the side opposite to the chassis and that respectively engage at least some pairs of the optical elements that are adjacent to each other, the holding member being arranged on a surface of the reflective sheet between said optical elements that are adjacent.

2. The illumination device according to claim 1, further comprising:
light source substrates that are fixed to the chassis to mount the light sources on the chassis, the light source substrates having the optical elements fixed thereto.

3. The illumination device according to claim 2,
wherein each of the optical elements has column-shaped attachment legs that are fixed to the light source substrate, and
wherein the attachment legs engage the holding member.

4. The illumination device according to claim 3,
wherein each of the optical elements has a lens part supported by the attachment legs and extending in an eave-shape from the attachment legs, and
wherein the lens part engages the holding member.

5. The illumination device according to claim 4,
wherein a width of the holding member is substantially the same size as a gap between the surface of the reflective sheet and the lens part facing said surface of the reflective sheet.

6. The illumination device according to claim 3,
wherein the holding member has two gripping parts respectively arranged on both ends thereof and a sheet pressing part that connects the two gripping parts, the gripping parts gripping a periphery of the attachment legs.

7. The illumination device according to claim 2,
wherein, with respect to some of said pairs of the optical elements that are mutually adjacent and that engage the holding members, one of the pair of the optical elements is on one light source substrate and another of the pair of the optical elements is on another light source substrate.

8. The illumination device according to claim 7,
wherein said one light source substrate is connected to said another light source substrate through a connector,
wherein the reflective sheet has a connector insertion hole between the two openings where the respective optical elements that are adjacent are inserted, the connecter insertion hole being where the connector is inserted, and wherein the holding member overlaps an edge of the connector insertion hole.

9. The illumination device according to claim 2, wherein the light source substrate is fixed to the chassis by a rivet, wherein the reflective sheet has a rivet insertion hole between the two openings where the respective optical elements that are adjacent are inserted, the rivet insertion hole being where the rivet is inserted, and wherein the holding member overlaps an edge of the rivet insertion hole.

10. The illumination device according to claim 1, wherein the holding member is an elastic looped member that surrounds the optical elements that are adjacent and that engages the optical elements by elastic force contracting in a circumferential direction.

11. The illumination device according to claim 1, wherein the optical elements are arranged in rows and columns inside the chassis, and wherein the holding member engages the optical elements located on edges, among the optical elements arranged in the rows and columns.

12. The illumination device according to claim 1, wherein the optical elements are diffusion lenses that diffuse light from the respective light sources.

13. A display device, comprising:

the illumination device according to claim 1; and a display panel that performs display using light from the illumination device.

14. The display device according to claim 13, wherein the display panel is a liquid crystal panel that has liquid crystal.

15. A television receiver, comprising the display device according to claim 14.

* * * * *